United States Patent
Tanaka

(10) Patent No.: US 9,361,660 B2
(45) Date of Patent: Jun. 7, 2016

(54) IMAGE PROCESSING DEVICE AND METHOD, SUPPLEMENT IMAGE GENERATION DEVICE AND METHOD, PROGRAM, AND RECORDING MEDIUM

(75) Inventor: Kenji Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 14/118,869

(22) PCT Filed: May 15, 2012

(86) PCT No.: PCT/JP2012/003171
§ 371 (c)(1),
(2), (4) Date: Nov. 19, 2013

(87) PCT Pub. No.: WO2012/160777
PCT Pub. Date: Nov. 29, 2012

(65) Prior Publication Data
US 2014/0104307 A1  Apr. 17, 2014

(30) Foreign Application Priority Data
May 23, 2011  (JP) ............................ 2011-114610

(51) Int. Cl.
| G06T 1/00 | (2006.01) |
| G06F 3/00 | (2006.01) |
| G06F 3/01 | (2006.01) |
| G06F 3/0481 | (2013.01) |

(52) U.S. Cl.
CPC . *G06T 1/00* (2013.01); *G06F 3/005* (2013.01); *G06F 3/012* (2013.01); *G06F 3/04815* (2013.01)

(58) Field of Classification Search
CPC ... G06T 7/0065; G06T 15/04; G06T 2200/08; G06T 5/50; G06T 7/002
USPC ........................ 345/629, 582, 630, 9; 382/285
See application file for complete search history.

(56) References Cited

U.S. PATENT DOCUMENTS

2008/0181486 A1* 7/2008 Spooner et al. .............. 382/154
2009/0315978 A1* 12/2009 Wurmlin et al. ............... 348/43
(Continued)

FOREIGN PATENT DOCUMENTS

| CN | 101919235 | 12/2010 |
| EP | 2 247 094 | 11/2010 |

(Continued)

OTHER PUBLICATIONS

Inamoto et al., Fly-Through Observation System for 3D Soccer Movie Based on Viewpoint Interpolation, The Journal of the Institute of Image Information and Television Engineers, Sep. 1, 2003 (date of receipt), vol. 58, No. 4, p. 529-539.
Kitahara, I. et al., Large-scale Virtualized Reality. pp. 1-4.
Kanade, T. et al., Virtualized Reality, Constructing Virtual Worlds from Real Scenes, Jan.-Mar. 1997 pp. 34-46.
Office Action issued in corresponding Japanese application No. 2011-114610 dated Sep. 15, 2015 and its English Translation.

*Primary Examiner* — Jeffrey Chow
(74) *Attorney, Agent, or Firm* — Frommer Lawrence & Haug LLP; William S. Frommer; Xuezheng Wang

(57) ABSTRACT

An image-processing apparatus for generating images from a plurality of viewpoints comprises a supplementation section that receives images captured by a plurality of image capturing devices arranged on a predetermined plane and generates supplemental images at a plurality of supplemental camera positions on the predetermined plane, each supplemental image being generated based on images captured by a predetermined number of the image capturing devices on the predetermined plane; and a viewpoint image generation section that generates a viewpoint image from a viewpoint by selecting pixels from the plurality of supplemental images and captured images.

19 Claims, 21 Drawing Sheets

(56) References Cited

U.S. PATENT DOCUMENTS

2010/0103175 A1* 4/2010 Okutomi ............... G06T 3/4053
                                                      345/428
2010/0202685 A1    8/2010 Naito
2010/0295855 A1   11/2010 Sasakawa et al.
2012/0177284 A1*  7/2012 Wang ............................ 382/154

FOREIGN PATENT DOCUMENTS

| JP | 4211292 | 11/2008 |
|----|---------|---------|
| JP | 2009-177251 | 8/2009 |
| JP | 2010-182205 | 8/2010 |
| WO | WO 2009/093587 | 7/2009 |

* cited by examiner

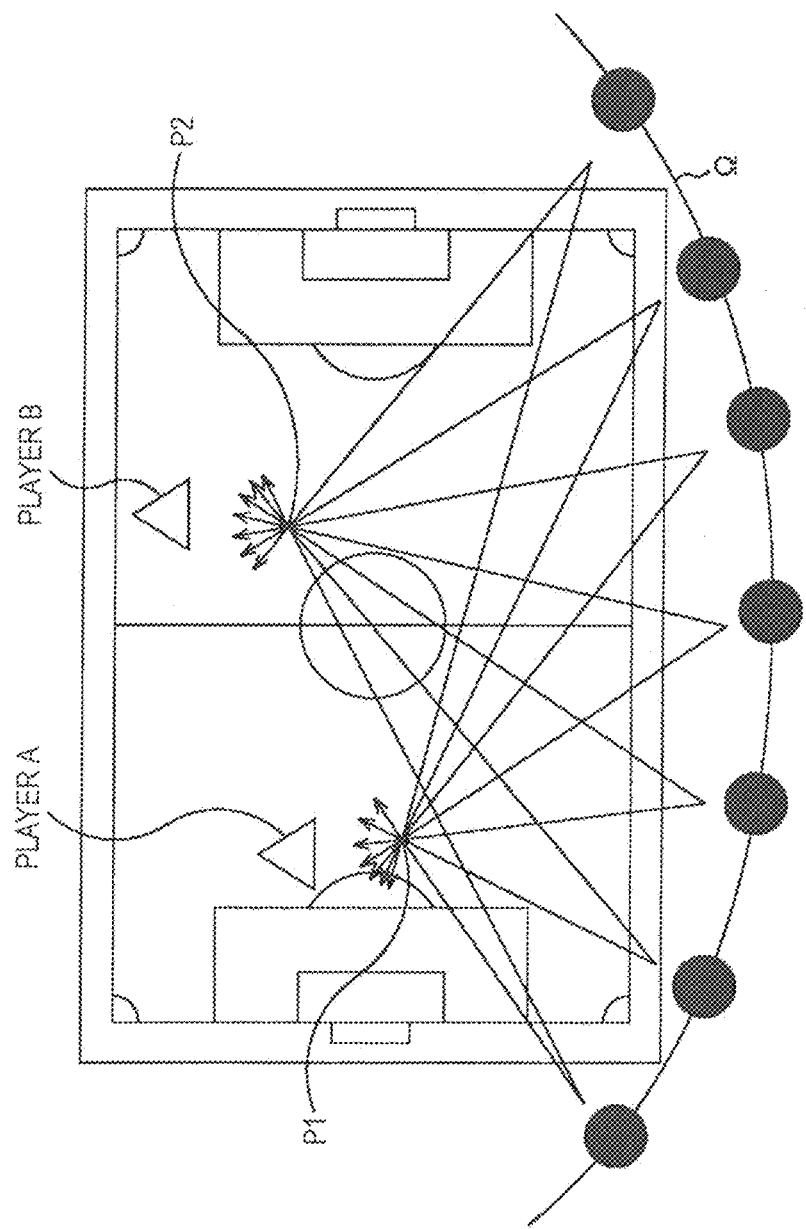

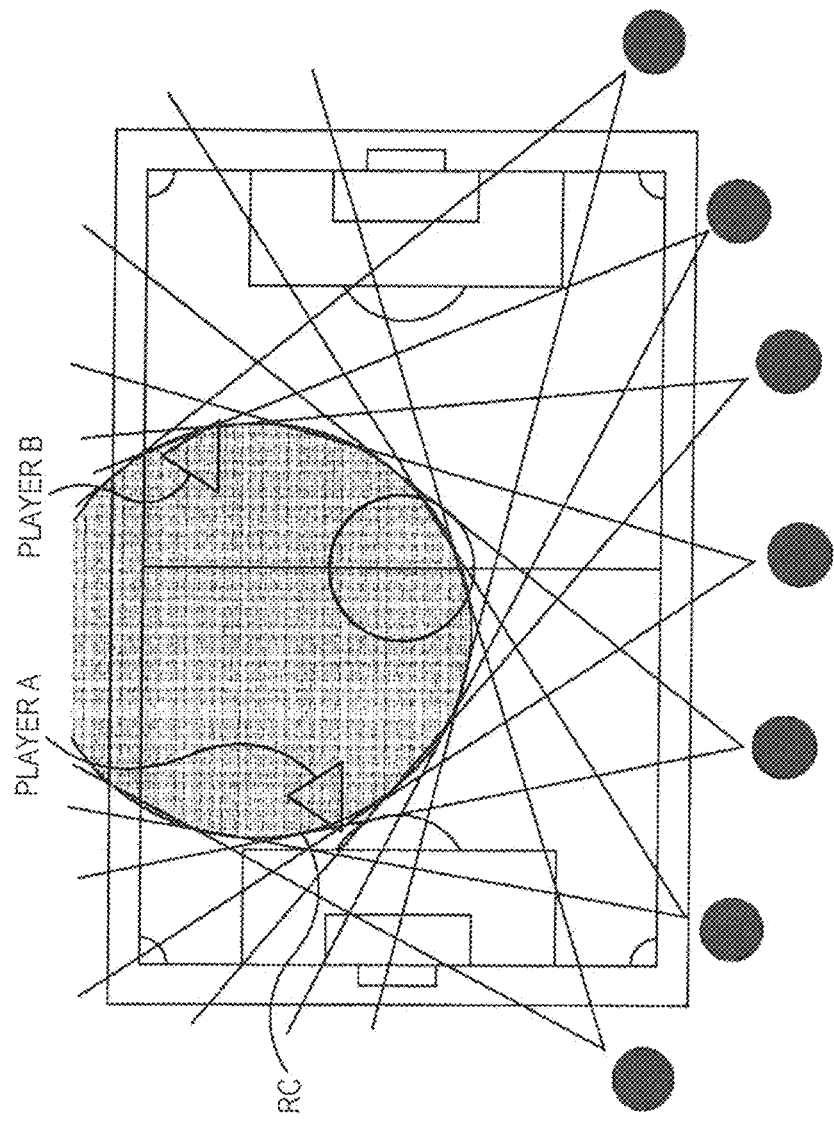

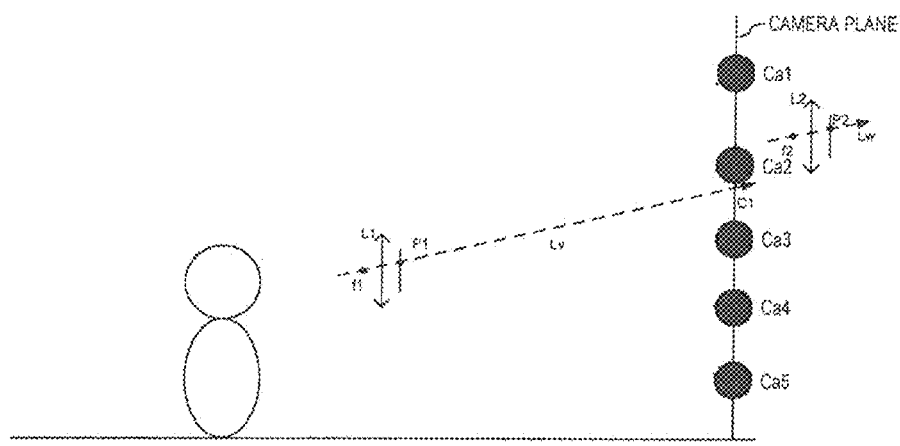
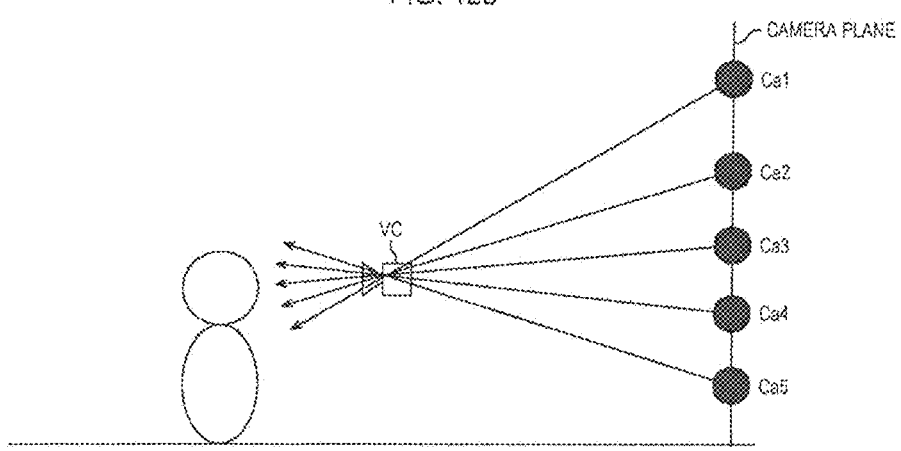

IMAGE PROCESSING DEVICE AND METHOD, SUPPLEMENT IMAGE GENERATION DEVICE AND METHOD, PROGRAM, AND RECORDING MEDIUM

TECHNICAL FIELD

The present invention relates to an image processing device and method, a supplement image generation device and method, a program, and a recording medium, and in particular relates to an image processing device and method, a supplement image generation device and method, a program, and a recording medium where it is possible to provide an image seen from a plurality of viewpoints in a wider range of space at a low cost.

BACKGROUND ART

In displays in the related art which use a CRT (Cathode Ray Tube), a liquid crystal panel, a projector, or the like, for example, an image which is imaged by a video camera (referred to simply below appropriately as a camera) is displayed. However, the image is, for example, only seen from the position of the camera as the viewpoint.

Accordingly, the image which is displayed in the display remains as an image seen from the center lens of the camera (referred to simply below appropriately as a camera viewpoint) even when, for example, a user changes the viewpoint when the viewing the image which is displayed in the display by moving his/her head.

Therefore, the applicants proposed a technique where it is possible to easily change the viewpoint of the user even with an actual image which is not in CG or the like (for example, refer to reference PTL1 included in the following Citation List). According to the technique of PTL1, it is possible to change the image which is displayed in the display according to a change in the viewpoint of the user.

In addition, a technique is proposed where an image seen from an arbitrary viewpoint is reconfigured as computer graphics where three-dimensional form of an object is estimated using an image which has been imaged using a plurality of camera and texture is added (for example, refer to reference NPL1 included in the following Citation List).

Furthermore, a camera is arranged so as to encompass a field in a stadium where the Super Bowl (American football) is being held and presentation is proposed where the viewpoint is freely switched in a scene which is to be replayed (for example, refer to reference NPL2 in the following Citation List).

CITATION LIST

Patent Literature

PTL 1: Japanese Patent No. 4211292

Non Patent Literature

NPL 1: T. Kanade and P. J. Narayanan P. W. Rander. Virtualized Reality Constructing Virtual Worlds from Real Scenes. IEEE Multimedia, Vol. 4, No. 1, pp. 34-47, 1997.
NPL 2: I. Kitahara, H. Saito, S. Akimichi, T. Ono, Y. Ohta and T. Kanade. Large-scale Virtualized Reality. IEEE Computer Society Conference on Computer Vision and Pattern Recognition (CVPR2001), 2001.

SUMMARY OF INVENTION

Technical Problem

However, in a method where a three-dimensional object model is estimated using stereo matching as in the technique of NPL1, there is a possibility that there are defects in a portion which is difficult to be modeled such as the hair of a person. When there are defects in the modeling in this manner, there is a problem that there is a large rupture in the image.

In addition, the processing load is large due to the addition of texture and the like and simplification of the processing is expected.

Furthermore, the ability to switch viewpoints in the case of the technique of NPL2 is only feasible in the case where the camera is actually arranged and there is a problem in that costs are involved in order to provide an image which is actually of interest.

Embodiments as set forth in the present disclosure take into consideration these circumstances and are able to provide an image seen from a plurality of viewpoints in a wider range of space at a low cost.

Solution to Problem

An embodiment as set forth in the present disclosure is directed to an image-processing apparatus for generating images from a plurality of viewpoints. The image-processing apparatus comprises a supplementation section that receives images captured by a plurality of image capturing devices arranged on a predetermined plane and generates supplemental images at a plurality of supplemental camera positions on the predetermined plane, each supplemental image being generated based on images captured by a predetermined number of the image capturing devices on the predetermined plane; and a viewpoint image generation section that generates a viewpoint image from a viewpoint by selecting pixels from the plurality of supplemental images and captured images.

According to another embodiment as set forth in the present disclosure, the predetermined plane is a curved plane surrounding an object of interest.

According to yet another embodiment as set forth in the present disclosure, optical axes of the plurality of the image capturing devices intersect with each other substantially at an object of interest.

According to yet another embodiment as set forth in the present disclosure, the viewpoint is selected from a focal area common to the plurality of the image capturing devices.

According to yet another embodiment as set forth in the present disclosure, the image supplementation section generates a plurality of deviation amounts, each representing a movement of a same object in images captured by two of the predetermined number of image capturing devices.

According to yet another embodiment as set forth in the present disclosure, the supplementation section calculates a deviation amount based on a parallax vector and a position vector of the two image capturing devices, and the supplementation section further determines a central value among the plurality of deviation amounts.

According to yet another embodiment as set forth in the present disclosure, the image supplementation section uses the plurality of deviation amounts and a supplemental camera position to generate a moving destination vector of the supplemental camera position.

According to yet another embodiment as set forth in the present disclosure, the image supplementation section extracts a movement of an image block of a plurality of pixels.

According to yet another embodiment as set forth in the present disclosure, the image block includes a plurality of pixels centered on a predetermined pixel.

According to yet another embodiment as set forth in the present disclosure, the image block includes a same class of pixels grouped according to colors of pixels by using a K-means method.

According to yet another embodiment as set forth in the present disclosure, for a pixel of the viewpoint image, the image generation section determines a supplemental image or a captured image closest to a first intersection where a first line connecting the pixel of the viewpoint image and a focal point of a first virtual camera at the viewpoint meets the predetermined plane and then selects, from the determined image, a pixel closest to a second intersection where a second line parallel with the first line and passing through a focal point of a second virtual camera of the determined image meets the determined image as the pixel of the viewpoint image.

According to yet another embodiment as set forth in the present disclosure, each supplemental image is generated using images captured by three triangularly-arranged image capturing devices.

Other embodiments as set forth in the present disclosure are directed to an image-processing method of generating images from a plurality of viewpoints and a recording medium storing an executable program executing the image-processing method. The image-processing method includes the functions of the image-processing apparatus as discussed above.

The above and other objects, features, and advantages of various embodiments of the present disclosure will be more apparent from the following detailed description of embodiments taken in conjunction with the accompanying drawings.

Advantageous Effects of Invention

According to the present invention, it is possible to provide an image seen from a plurality of viewpoints in a wider range of space at a low cost.

BRIEF DESCRIPTION OF DRAWINGS

The following detailed description, given by way of example, but not intended to limit the disclosure solely to the specific embodiments described, may best be understood in conjunction with the accompanying drawings, in which:

FIG. 10 is a diagram describing a camera plane in a soccer stadium and the images from each viewpoint.

FIG. 11 is a diagram describing a position where it is possible to arrange a virtual camera.

FIG. 12a is a diagram describing a method for obtaining a value of a pixel of an image from a viewpoint.

FIG. 12b is a diagram describing a limit on the arrangement position of a virtual camera.

DESCRIPTION OF EMBODIMENTS

Below, the embodiments of the disclosure which is disclosed here will be described with reference to the diagrams. Reference will now be made in detail to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the scope or spirit of the present disclosure. For instance, features illustrated or described as part of one embodiment can be used in another embodiment to yield a still further embodiment. It is intended that the present disclosure covers such modifications, combinations, additions, deletions, applications and variations that come within the scope of the appended claims and their equivalents.

Figure 1:
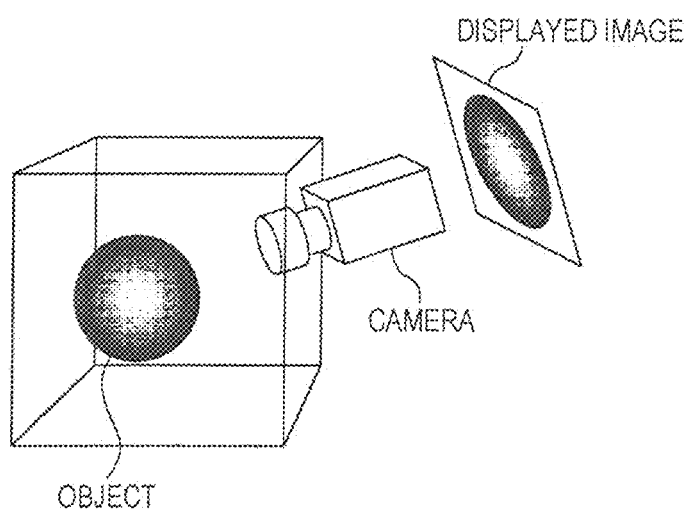
FIG. 1 is a diagram describing the viewpoint of an image in the related art.

In the displays in the related art which used liquid crystal panels, projectors, and the like, for example, an image which is imaged by a video camera (referred to simply below appropriately as a camera) is displayed. However, the image is only seen from the position of the camera as the viewpoint as shown in FIG. 1.

Accordingly, even when, for example, a user changes the viewpoint when the viewing the image which is displayed in the display by moving his/her head, the image which is displayed in the display remains as an image seen from the center lens of the camera (referred to simply below appropriately as a camera viewpoint) and there is no change in the image which is displayed in the display according to the change in the viewpoint of the user.

Figure 2:
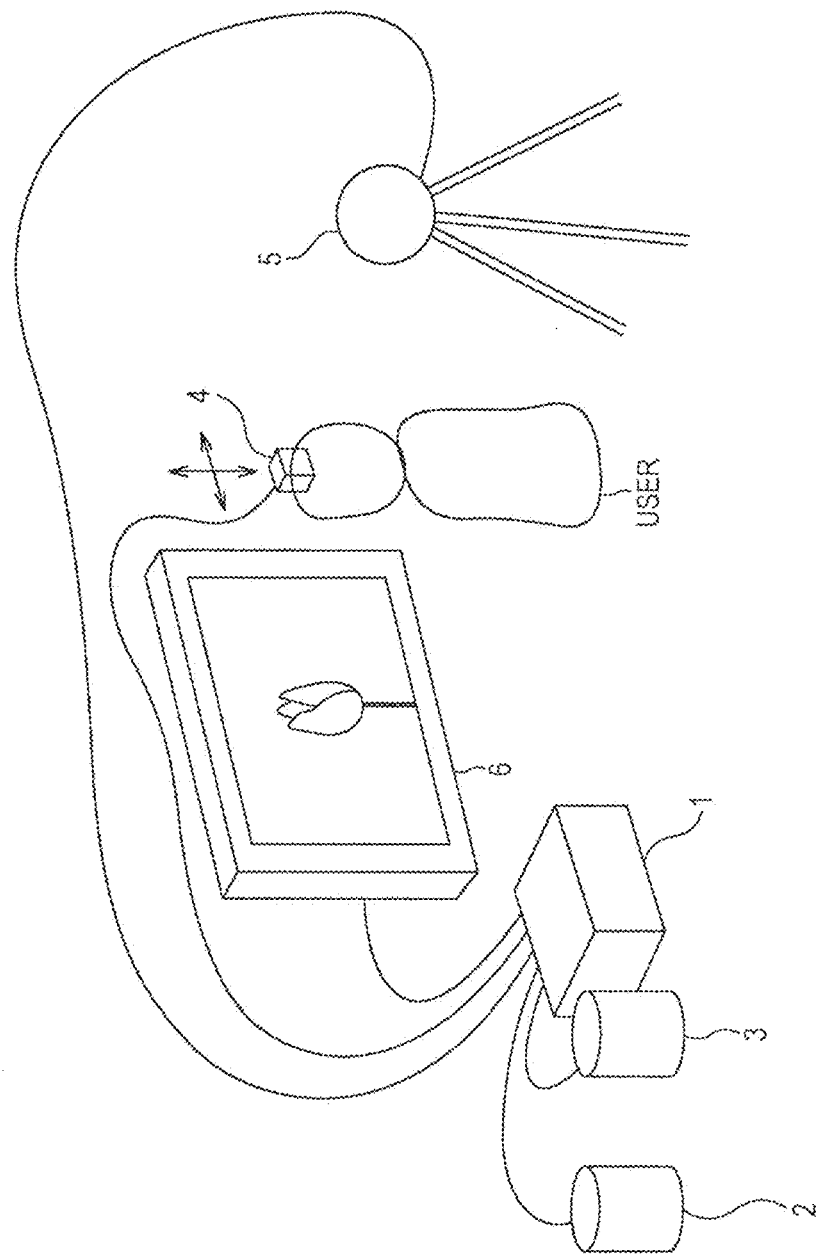
FIG. 2 is a diagram illustrating a configuration example of an embodiment of an image display device which realizes multi-viewpoint display.

FIG. 2 is a diagram illustrating a configuration example of an embodiment of an image display device which realizes multi-viewpoint display.

A computer 1 converts original image data which is stored in an image database 2 into intermediate data and stores in the intermediate database 3. In addition, the computer 1 controls a receiver 4 and a transmitter 5 which is a position sensor and detects the position of a user (furthermore, the posture thereof when necessary) based on the output of the receiver 4.

Furthermore, the computer 1 sets the user position as a user viewpoint position and converts the intermediate data which is stored in the intermediate database 3 to image data seen from the viewpoint of the user (referred to below appropriately as presentation image data). Then, the computer 1 displays the presentation image data by supplying the presentation image data to a display 6.

The image database 2 stores the original image data as the actual image by being imaged using an imaging device such as a camera as will be described later. The intermediate database 3 stores the intermediate data which has been converted from the original image data which is supplied from the computer 1.

The receiver 4 is mounted on a user, a magnetic field which is generated by the transmitter 5 is detected, and the strength of the magnetic field is supplied to the computer 1. The transmitter 5 generates a magnetic field following the control of the computer 1. That is, in the embodiment of FIG. 2, the receiver 4 and the transmitter 5 together form a magnetic sensor which is a position sensor that detects the position of the receiver 4, and as a consequence, the position of the user is able to be detected by the receiver 4 measuring the strength of the magnetic field which is generated by the transmitter 5.

Here, the receiver 4 is, for example, mounted on the head of a user. In addition, for example, in a case where the user wears a neck tie or wears glasses, it is possible for the receiver 4 being mounted on the neck tie or the frame of the glasses.

Here, the magnetic sensor which is the position sensor, for example, may be configured as a three-dimensional position sensor of Polhemus or the like.

In addition, the position sensor, for example, may be a position measurement means (for example, three-dimensional digitizer) such as a mechanical ring type other than a magnetic sensor. Furthermore, the position sensor, for example, may be a means where it is possible to input changes in the position of a user such as a joystick or a track ball. In such a case, the position sensor does not necessarily detect the actual position of the user, but, for example, detects a virtual position of the user to be input.

For example, the display 6 is configured by, for example, a liquid crystal panel or the like and displays presentation data which is supplied from the computer 1. Here, as the display 6, other than a CRT or a liquid crystal panel, it is possible to adopt, for example, a projector, a HMD (Head Mounted Display), or the like.

Figure 3:
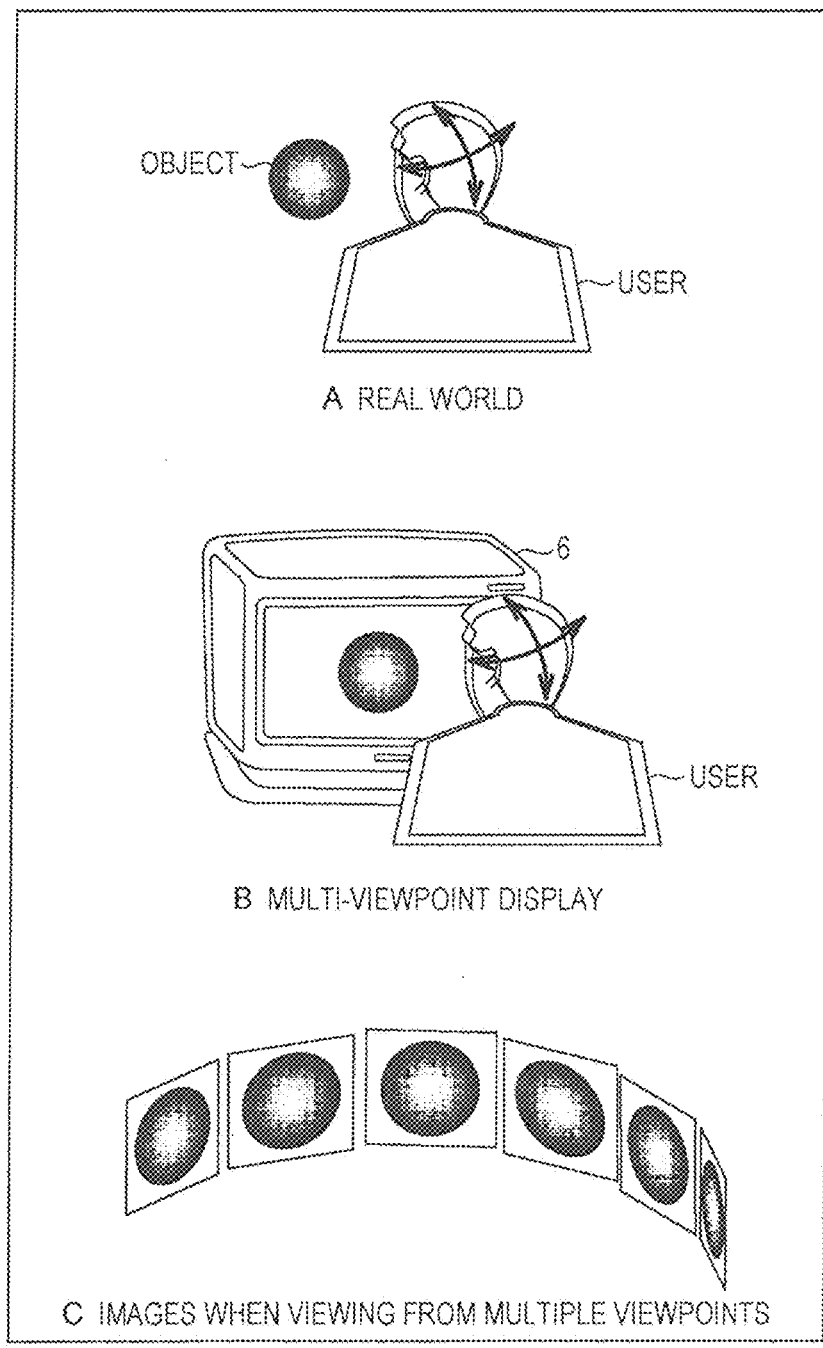
FIG. 3 is a diagram describing display of an image with a plurality of viewpoints in the image display device of FIG. 2.

In the image display device of FIG. 2, for example, as shown in A of FIG. 3, the presentation image data is displayed which is the same as a case where the user observes a certain object in the real world.

That is, in a case where the user views a certain object in the real world, when the user moves to a viewpoint, it is possible for the user to observe the object seen from the viewpoint after movement. Specifically, the portion of the object which is able to be seen and the portion which is not able to be seen changes in the real world due to the user moving the viewpoint.

Even in the image display device of FIG. 2, as shown in B of FIG. 3, the presentation image data which is displayed in the display 6 displays the object which shows up in the sight of the user in the real world according to the viewpoint in a case where the user moves the viewpoint. That is, in the image display device of FIG. 2, as shown in C of FIG. 3, the presentation image data in a case where the object is seen from the viewpoint is displayed in a case where the user moves the viewpoint.

Accordingly, in the image display device of FIG. 2, for example, the presentation image data which is in a state where a portion of the object, which was not able to be seen from the viewpoint previous to the movement, is able to be seen is displayed when the user moves the viewpoint. That is, the presentation image data which is the same as being shown up in sight in a case where the object is seen from the viewpoint after movement in the real world when the viewpoint is moved so that the user peeks at the object which is displayed in the presentation image data in the display 6. Due to this, it is possible for the image display device of FIG. 2 to be a multi-viewpoint display.

Next, generation of a multi-viewpoint image will be described.

Here, a local plane $\Omega$ which encompasses the object will be considered. The trajectory of a light flux when the object is seen from a viewpoint P (trajectory of a light flux which is incident from the object to a viewpoint P) is able to be realized using a straight line which connects the viewpoint P and each point on the object. The light flux necessarily intersects with a curved plane $\Omega$.

If it is possible to obtain an image which is acquired in all of the viewpoints on the curved plane $\Omega$, it is possible to obtain a pixel value which corresponds to the light flux which is represented by the straight line which connects the viewpoint P and each of the points on the object. Accordingly, if it is possible to obtain the image which is acquired in all of the viewpoints on the curved plane $\Omega$, it is possible to generate an image of the object seen from an arbitrary point in the curved plane using the pixel value of the images.

For example, a straight line Li which connects the viewpoint P and a point Ri on the object is focused on and the intersection of the straight line Li and the curved plane $\Omega$ is represented as Qi. Here, with an arbitrary point on the curved plane $\Omega$ as the viewpoint, the image data where the object is imaged is stored in a database.

With the assumption that the light flux progresses in a straight line and does not deteriorate, the light flux which is incident on the point Qi on the curved plane $\Omega$ and the light flux which is incident on the viewpoint P from the point Ri on the object are the same. Accordingly, in a case where the object is seen from the viewpoint P, the pixel value which corresponds to the light flux which heads from the point Ri on the object to the viewpoint P matches with the pixel value which corresponds to the light flux which heads from the point Ri on the object to the point Qi on the curved plane $\Omega$ and the pixel value is stored in a database.

Due to this, the pixel value when the point Ri on the object is seen from the viewpoint P is able to be obtained from the image data which is imaged with the point Qi of the curved plane $\Omega$ as the viewpoint.

Figure 4:
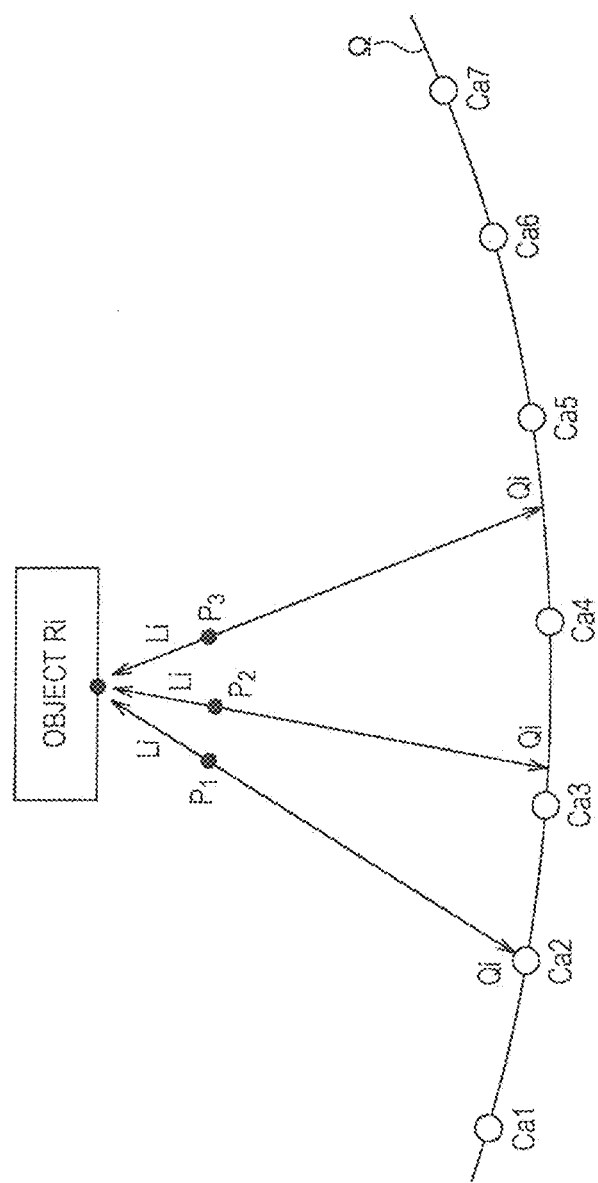
FIG. 4 is a diagram describing generation of an image in each viewpoint.

For example, a camera Ca1 to a camera Ca7 are arranged on the curved plane $\Omega$ which encompasses the object which is shown in FIG. 4. In this case, since it is possible for the pixel value when the point Ri on the object is seen from the a viewpoint P1 to be obtained from the image data which is imaged with the point Qi on the curved plane $\Omega$ as the viewpoint, it is possible to obtain from the image data which is imaged using the camera Ca2.

On the other hand, it is possible to obtain the pixel image when the point Ri on the object is seen from a viewpoint P2. The pixel image may be obtained from the image data which is imaged with the point Qi on the curved plane Ω as the viewpoint, but it is not readily available to obtain image data between the camera Ca3 and the camera Ca4 since a camera is not arranged therebetween. In the same manner, it is possible to obtain the pixel image when the point Ri on the object is seen from a viewpoint P3 from the image data which is imaged with the point Qi on the curved plane Ω as the viewpoint, but it is not readily available to obtain image data between the camera Ca4 and the camera Ca5 since a camera is not arranged therebetween.

In this manner, in the formation of FIG. 4, it is possible to obtain the pixel value when the point Ri on the object is seen from the viewpoint P1, but it is not readily available to obtain the pixel values when the point Ri on the object is seen from the viewpoint P2 or the viewpoint P3. As a result, the generation of a multi-viewpoint image is possible, but it is not readily available to generate an image from an arbitrary viewpoint without further interpolation of image data.

In order to generate an image from an arbitrary viewpoint, for example, it seems to be necessary to arrange cameras in all positions on the curved plane Ω of FIG. 4. However, in reality, cameras are arranged on the curved plane Ω at limited positions, such as Ca1 to Ca 7, and it is possible to supplement the images which are imaged from all of the positions on the curved plane Ω using the images which are imaged using the cameras Ca1 to Ca7.

Figure 5:
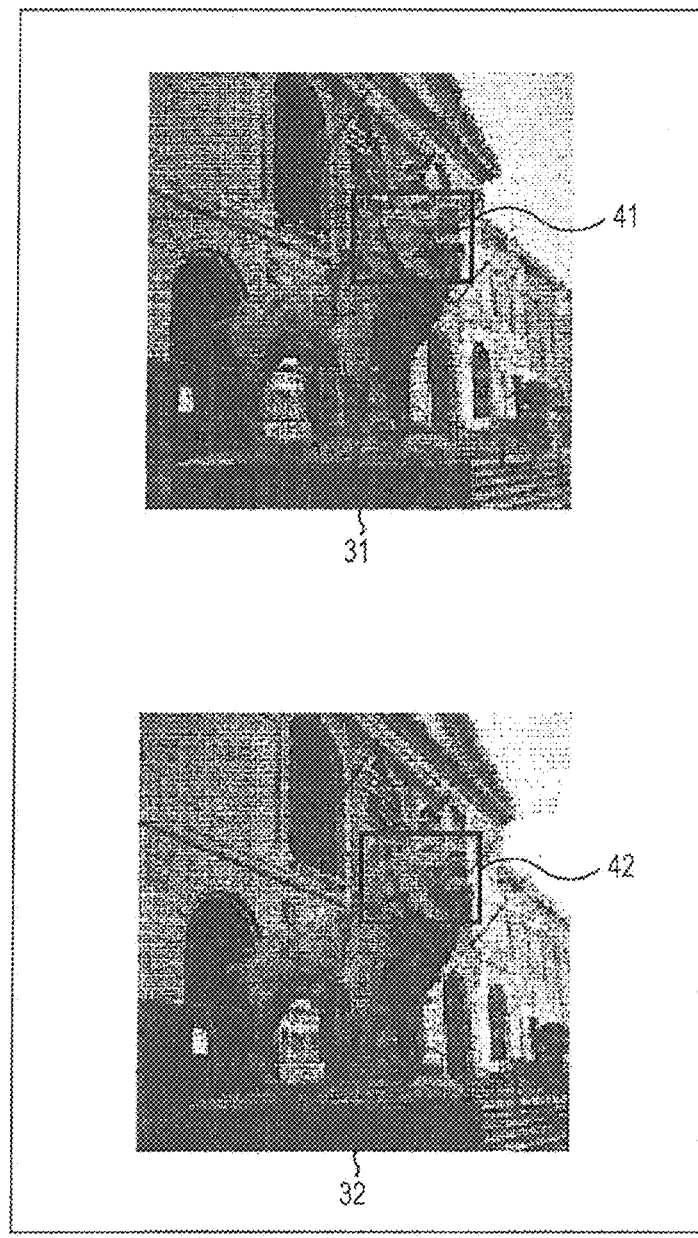
FIG. 5 is a diagram illustrating an example of an image which is imaged in stereo.

FIG. 5 is a diagram describing geometrical characteristics of an image which is imaged in stereo. The right side of the diagram 32 and the left side of the diagram 31 in FIG. 5 show examples of images where the same object (a statue of a lion) is imaged by a camera from angles which are different from each other.

That is, FIG. 5 is a diagram illustrating an example of an object which is imaged in stereo.

An image 32 on the right side in the diagram is an image where the object is imaged by moving the camera further to the right direction than the position of the camera which imaged an image 31 on the left side of the diagram. In this case, the positions of the camera in the image 31 and the image 32 are the same in terms of distance from the object and is the same in terms of height from the ground.

In this manner, the pixels of the object in the image which has been imaged move horizontally to the left side when the image is imaged by the camera being moved horizontally to the right side.

For example, the pixels, which configure the image of the face of the lion which is shown in a frame 41 with a rectangular shape in the image 31, is moved to the left side in the diagram in the image 32.

In this manner, there are geometrical characteristics such that the image moves in parallel with the movement direction of the camera as described above in the image which is images in stereo.

Based on the geometrical characteristics of the image such as these, it is possible to generate the images where the viewpoints (that is, the position of the camera) move in a parallel manner. The image which is generated (supplemented) in this manner is referred to as an epipolar plane image (EPI).

According to the EPI, for example, due to the images of the camera which is arranged in two positions which are different, it is possible that the images, which are imaged by the camera being moved horizontally between each of the positions, are generated in a virtual manner and to supplement an image which is not actually acquired. In addition, in the same manner, due to the images of the camera which is arranged in two positions which are different, it is possible that the images, which are imaged by the camera being moved vertically between each of the positions, are generated in a virtual manner and to supplement an image which is not actually acquired.

Figure 6:
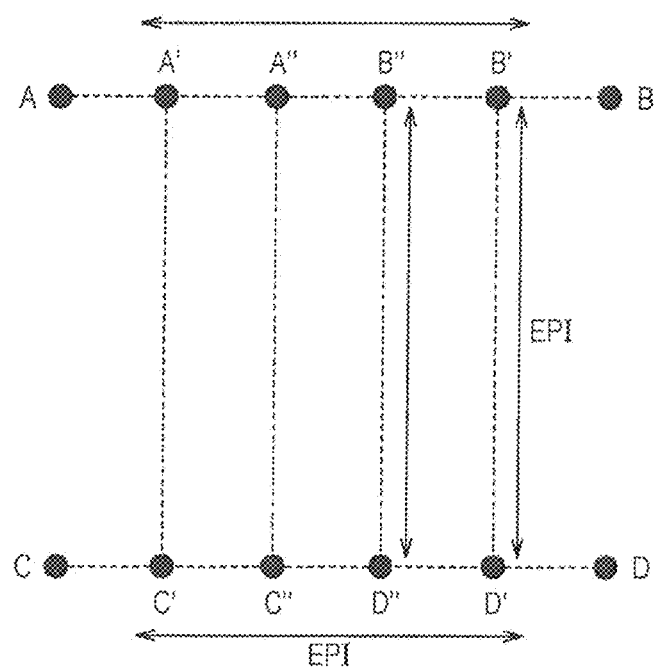
FIG. 6 is a diagram describing an example of supplementing an image using EPI.

For example, as shown in FIG. 6, the cameras are actually arranged in each of four points of position A to position D. The position A and the position B are separated by a distance L in a horizontal direction and are the same in the vertical direction. In addition, the position C and the position D are separated by the distance L in a horizontal direction and are the same in the vertical direction.

Accordingly, the images which are obtained in a case of imaging by cameras being arranged in a position A', a position A", a position B", and a position B' between the position A and the position B are able to be supplemented using the image which is imaged using the camera at the position A and the image which is imaged using the camera at the position B. In addition, the images which are obtained in a case of imaging by cameras being arranged in a position C', a position C", a position D", and a position D' between the position C and the position D are able to be supplemented using the image which is imaged using the camera at the position C and the image which is imaged using the camera at the position D. In this manner, it is possible to perform supplementing of the images in the horizontal direction using the EPI.

Furthermore, the position A and the position C and the position B and the position D are each separated by the distance L in a vertical direction and are the same in the horizontal direction. By doing this, with regard to the positions between the position A and the position C and the positions between the position B and the position D, it is possible to perform supplementing of the image in the vertical direction using the EPI.

In addition, it is possible to perform supplementing of the image in the vertical direction based on the image which is obtained by the supplementing in the horizontal direction using the EPI. For example, an image which is obtained in a case of imaging by a camera being arranged at a position between the position A' and the position C', supplementing is possible using an image which is imaged by a camera at the position A' and an image which is imaged by a camera at the position C'. In the same manner, supplementing is also possible with regard to an image which is obtained in a case of imaging by a camera being arranged at a position between the position A" and the position C", an image which is obtained in a case of imaging by a camera being arranged at a position between the position B" and the position D", and an image which is obtained in a case of imaging by a camera being arranged at a position between the position B' and the position D'.

That is, using the EPI which uses image of four cameras which are each arranged at each corner of a square ABCD, it is possible to supplement an image which is imaged from each position in the plane of the square ABCD. That is, for example, it is possible to supplement an image which is imaged from all of the positions on the curved plane Ω using the images which are imaged using the camera Ca1 to the camera Ca7 of FIG. 4.

However, there are the following problems in the image supplementing method described above (which will be referred to as the four point supplementing method).

For example, there are problems that the amount of calculation is huge and the processing load and the processing time are substantially increased in the four point supplementing method. For example, in the case of the example of FIG. 6, after the supplementing of the position A and the position B in the horizontal direction and the supplementing of the position C and the position D in the horizontal direction, it is necessary that a plurality of calculations are performed for the supplementing in the vertical direction.

In addition, for example, there is a problem that robustness is weak in the four point supplementing method. That is, the supplementing of the position A' and the position C' of FIG. 6 in the vertical direction is originally performed based on an image at the position A' and an image at the position C' which are obtained using supplementing in the horizontal direction. For example, when the image at the position A' and the image at the position C' are supplemented, in a case where there are errors such as a calculation error, each of the images which are generated using supplementing in the vertical direction transfer the error thereof.

Therefore, in the present invention, a method according to an embodiment is adopted as follows.

Figure 7:
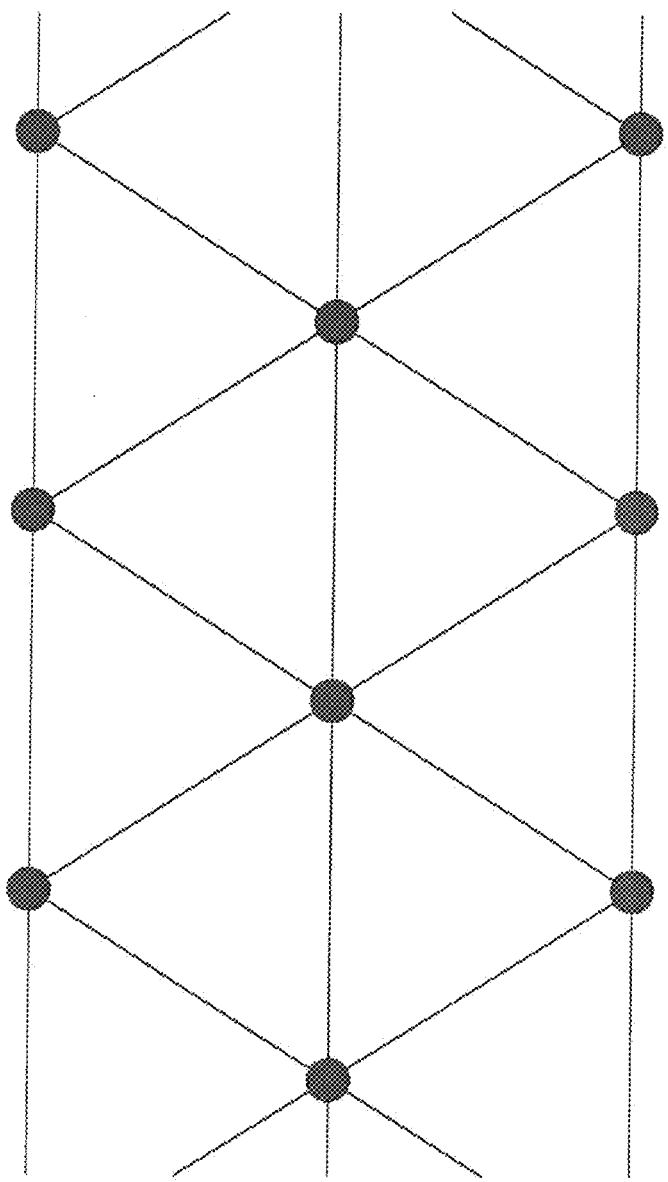
FIG. 7 is a diagram illustrating an example of the arrangement of actual cameras.

For example, cameras are arranged as shown in FIG. 7. The arrangement positions of the cameras are shown using black circles in FIG. 7 and an image is imaged using the cameras. In the example of the same diagram, triangles where the respective cameras are the corner are shown. In the present invention, an image, which is imaged using a camera which is arranged in an arbitrary position in a plane of a triangle, is supplemented based on each of the images which are imaged using the three units of cameras which are arranged in the corners of the triangle.

Figure 8:
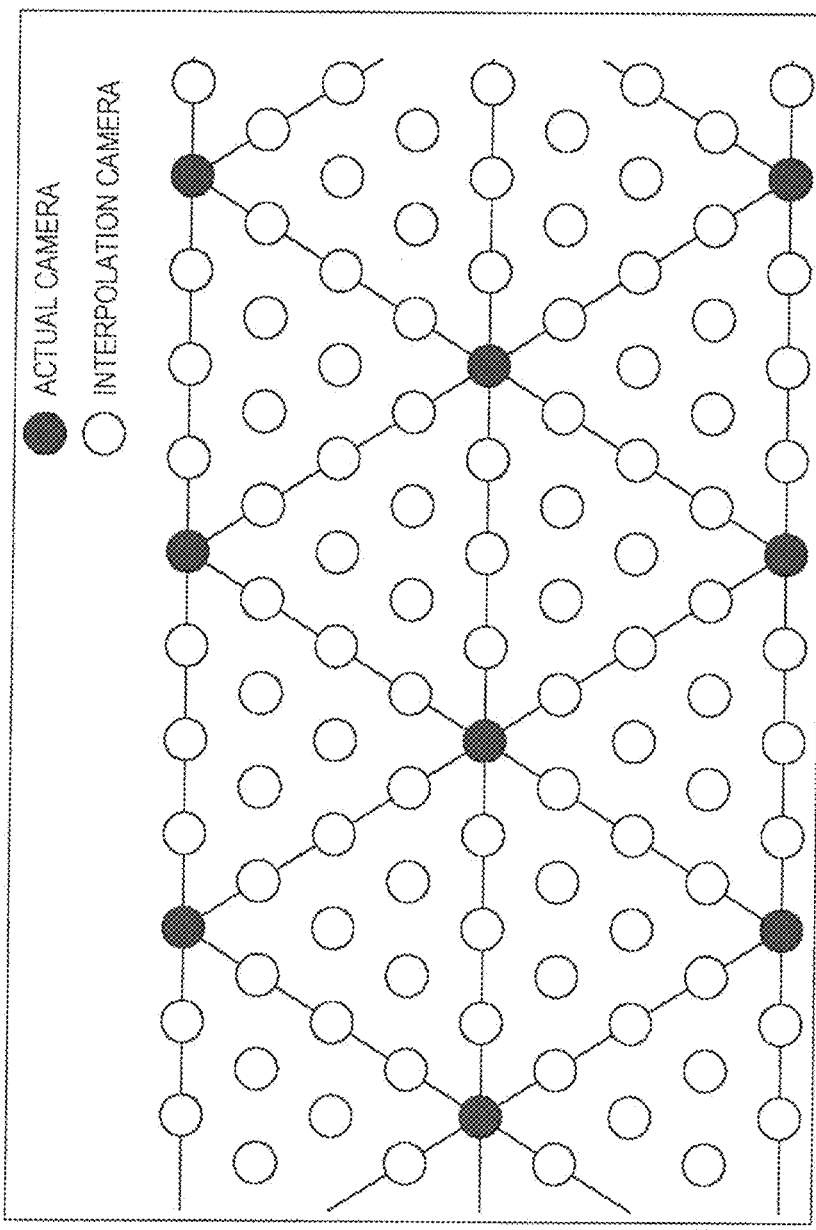
FIG. 8 is a diagram illustrating an example of the arrangement of actual cameras and supplement cameras.

That is, for example, as shown in FIG. 8, the image is imaged using a camera which is not actually arranged. In FIG. 8, the arrangement positions of the camera are shown using black circles in the diagram and the arrangement position of the cameras which correspond to the images which are supplemented are shown using white circles in the diagram. Here, the camera which corresponds to the image which is supplemented is referred to as a supplement camera or an interpolation camera.

For example, in a state where the actual cameras are arranged so as to encompass the object and the supplement cameras are arranged as shown in FIG. 8, it is possible to obtain image data which is imaged at an arbitrary point on the curved plane Ω which is described above with reference to FIG. 4. Below, the plane (curved plane) which is formed due to the actual cameras and the supplement cameras is referred to as the camera plane.

The supplementing of the image which is imaged using a camera which is arranged in an arbitrary position in a plane of a triangle based on the images which are each imaged using three cameras which are arranged at the corners of the triangle is able to be performed as follows.

Figure 9:
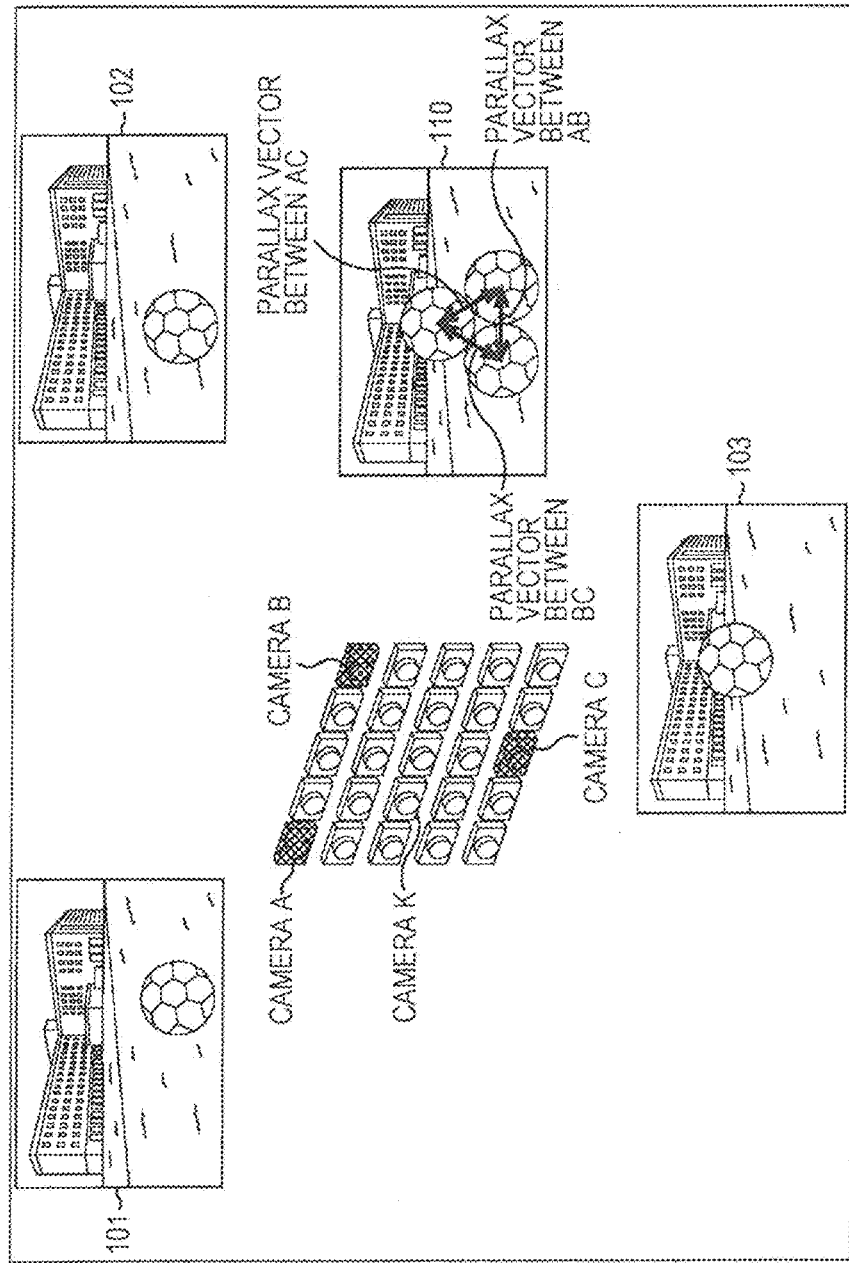
FIG. 9 is a diagram describing the relationship of the position of the camera and parallax of the image in a three point supplementing method.

For example, as shown in FIG. 9, a camera A, a camera B, and a camera C which are actual cameras are arranged in positions which are the corners of a triangle. In the same diagram, an image 101 which is imaged using the camera A, an image 102 which is imaged using the camera B, and an image 103 which is imaged using the camera C are shown. In the example, each of the image 101 to the image 103 aims to focus on a soccer ball, where the ground, school buildings, and the like are displayed in the background of the soccer ball.

In the same manner as the case which was described with reference to FIG. 5, each of the soccer ball positions in the image 101 to the image 103 are deviated or shifted from each other and according to the positions of the camera A, the camera B, and the camera C. For example, the soccer ball is displayed in the lower right of the image in the image 101, but the soccer ball is displayed in the lower left of the image in the image 102. Furthermore, the soccer ball is displayed substantially in the center of the image in the image 103.

When the image of the background is fixed and the image of the soccer ball is displayed so as to overlap in the images 101 and the images 103, an image 110 is formed. In the image 110, the images of three soccer balls are displayed so as to show the deviation of the soccer ball positions. Straight lines which connect the center points of the three soccer balls are vectors which represent the parallax in each of the images of the image 101 to the image 103.

That is, each side of the triangle, which is configured using the straight lines which connect the center points of the three soccer balls which are displayed in the image 110, are parallax vectors which represent the parallax using the camera positions. One side of the triangle is a vector which represents the parallax of the camera A and the camera B (AB parallax vector), another side of the triangle is a vector which represents the parallax of the camera B and the camera C (BC parallax vector), and a further side of the triangle is a vector which represents the parallax of the camera A and the camera C (AC parallax vector).

On the other hand, in the camera A to the camera C which are actual cameras, vectors which represent the positions of each of the cameras are able to be obtained using a straight line which connects the center points of the lenses of each of the cameras. For example, a vector (AB vector) which represents the distance and direction from the position of the camera A and the position of the camera B is configured using the straight line which connects the center points of the lenses of each of the camera A and the camera B. In addition, a vector (BC vector) which represents the distance and direction from the position of the camera B and the position of the camera C is configured using the straight line which connects the center points of the lenses of each of the camera B and the camera C. Furthermore, a vector (AC vector) which represents the distance and direction from the position of the camera A and the position of the camera C is configured using the straight line which connects the center points of the lenses of each of the camera A and the camera C.

By doing this, for example, it is possible for the amount of deviation of the object (for example, the soccer ball) in the image 101 and the image 102 to be calculated as (AB parallax vector)/(AB vector). The amount of deviation indicates the shift or offset or movement of a same object in different images taken from different camera positions or viewpoint positions. The amount of deviation is relative to the actual camera position. In addition, it is possible for the amount of deviation of the object (for example, the soccer ball) in the image 102 and the image 103 to be calculated as (BC parallax vector)/(BC vector). Furthermore, it is possible for the amount of deviation of the object (for example, the soccer ball) in the image 101 and the image 103 to be calculated as (AC parallax vector)/(AC vector).

Here, out of the three types of calculations described above, the amount of deviation is expected to be the same in the case where any of the calculations are performed, but there are cases where calculation errors occur. For example, it is possible to suppress the generation of calculation errors by the central value of the result of the three types of calculations described above being calculated and the value being the amount of deviation. The center value may be the mean value or the median value of the three amounts of deviation.

For example, in a case of calculating a pixel position of the object in an image which is imaged using a camera K in FIG. 9, it is possible to specify the pixel position using a vector which is obtained by multiplying the AK vector which connects the center point of the lens of each of the camera A and the camera K by the amount of deviation which is obtained as described above. That is, the pixels of the soccer ball in the image 101 are moved to a position which is set using the vector which was obtained by multiplying the AK vector with the amount of deviation.

Here, in FIG. 9, an example is described where the camera A, the camera B, and the camera C are arranged in positions which are the corners of a substantially equilateral triangle, but it is not necessary for it to be an equilateral triangle.

In this manner, it is possible to generate an image of the supplement camera. As described above, in the present invention, it is possible to supplement an image which is imaged at an arbitrary position in a plane of a triangle and this method is referred to as a three point supplementing method. Different from the case of the four point supplementing method, for example, in the three point supplementing method, performing of calculations for supplementing in the vertical direction after the completion of the supplementing in the horizontal direction is not necessary and it is possible to suppress the amount of calculation, the process load, and the processing time. In addition, different to the case of the four point supplementing method, in the three point supplementing method, in a case where there is an error such as calculation error, there is no problem in this error being transferred and there is ample robustness.

Furthermore, according to the present invention, it is possible to generate a multi-viewpoint image using the images which are generated using the actual cameras and the images which are generated using the supplement cameras. FIG. 10 is a diagram illustrating an example where a multi-viewpoint image is generated according to the present invention.

For example, as shown in FIG. 10, actual cameras are arranged so as to encompass a soccer field. In this case, the actual cameras are shown using black circles in the diagram. As described above, the images of the supplement cameras are supplemented by the three point supplementing method using the images which are imaged using the actual cameras and the camera plane is configured as the curved plane Ω. At this time, the focal points of the actual cameras are directed toward one point in the soccer field.

Here, in the example of FIG. 10, the cameras appear by being lined up in one row in the horizontal direction, but in practice, the cameras are also lined up in the vertical direction (depth direction of the paper surface) so that it is possible to adopt the three point supplementing method which is described above by referencing FIGS. 7 and 8.

In addition, in practice, the camera plane is not a planar surface and is a curved surface as is shown in FIG. 8, but it is possible to make the triangles which are configured by three units of actual cameras to seem as individual planar surfaces when the image of the supplement camera is supplemented using the three point supplementing method. As such, even with the camera plane which is a curved plane as shown in FIG. 10, it is possible to adopt the three point supplementing method which is described above by referencing FIGS. 7 and 8.

Here, a case is considered where an image seen from a viewpoint P1 which is close to a player A and an image seen from a viewpoint P2 which is close to a player B are generated. In this case, images seen from the viewpoint P1 or the viewpoint P2 are obtained by imaging images by disposing virtual cameras (virtual cameras) in the viewpoint P1 or the viewpoint P2.

Here, it is considered that the virtual camera is a pin hole camera and the image is recorded using a film or a CCD in an inner portion of the pinhole camera. For example, pixel values of individual pixels which configure the film (CCD) surface of the virtual camera are set using light fluxes which are parallel to straight lines which connect the focal point of the virtual camera (pin hole) and each of the pixels in the film surface. That is, with regard to each of the individual pixels according to the level of resolution of the virtual cameras, it is possible to specify the light fluxes which are incident on the pixel for each of the pixels if the straight line which connects the pixel and the focal point is specified.

When assuming that light does not deteriorate, if the straight line which connects the focal point of the virtual camera and each of the pixels of the film surface is extended until the curved plane Ω, the light fluxes which are incident on each of the pixels of the virtual cameras are incident on the intersection of the straight line and the curved plane Ω. That is, it is possible to configure the pixels of the virtual camera one at a time using the pixels of the image which are imaged at one point on the camera plane (curved plane Ω).

That is, as shown in FIG. 12a, in a case where a certain image is generated with the virtual camera Li, the values of pixels of the image need to be determined. First, the straight line which connects the pixel P1, a pixel of interest in the image, (the straight line is referred to as a straight line Lv) and the focal point f1 is extended until the camera plane. The intersection with the camera plane is shown as C1 and the closest camera to the intersection C1 of the straight line Lv and the camera plane is Ca2 and is selected out of the actual camera or the virtual camera. Then, a half straight line Lw which is parallel to the straight line Lv is assumed with the focal point f2 of the actual camera or the supplement camera which has been selected as the origin. Here, there is the focal point and the film (CCD) surface in the actual camera and the supplement camera. The half straight line Lw intersects with the image of the camera Ca2 at the pixel P2, whose value is selected to be used for the value of the pixel P1.

Then, the pixel, which is the closest to the intersection of the half straight line Lw and the film surface of the actual camera or the supplement camera which has been selected, is extracted as the pixel in the virtual camera. The pixel is specified as one pixel among the plurality of the pixels which configures the image of the actual camera or the image of the supplement camera.

In this manner, the image which is imaged using the virtual camera is generated by the pixels of the image which is imaged by the camera in the camera plane being individually extracted. Due to this, the image seen from the viewpoint P1 and the viewpoint P2 is generated.

Here, in the case of considering only the horizontal direction, it is possible to generate an image seen from an arbitrary point if the object, which is positioned in the imaging range of the actual camera which is positioned in the far left of the camera plane and which is positioned in the imaging range of the actual camera which is positioned in the far right of the camera plane, is imaged. That is, for example, as shown in FIG. 11, it is possible to arrange the virtual camera if in an inner portion of a space RC which is the imaging range which is common to each of the actual cameras which are arranged in the surroundings of the soccer stadium.

For example, when a soccer match is being shown live, the space RC moves with the ball if the image is imaged so as to follow the ball with the actual cameras. As a result, for example, it is possible to present a certain image to viewers from a viewpoint by arranging the virtual cameras in various positions in the surroundings of the ball.

In the case where there are many units of the actual cameras, there are cases where it is difficult to gather people to operate the cameras to the extent of the number of cameras. In such a case, it is preferable that the other cameras be automatically operated so that, for example, a point, where straight lines which pass through the center of the lens of two arbitrary cameras and the focal point intersect, is the focal point. That is, if it is possible to determine a point where light fluxes of the light which is incident on the lenses of at least two units of the cameras intersect, it is possible to image the object in substantially the same location using all of the cameras if the other cameras track with the point as the focal point.

By doing this, it is possible for the space RC to move with the ball by cameras being operated by at least two people who operates the cameras.

In addition, for example, it is possible to arrange the virtual cameras in any position on the pitch if the actual cameras are arranged so as to encompass the entirety of the surroundings of the soccer field.

However, since it is considered that it is not possible to arrange the actual cameras above and below the soccer stadium, it is possible to freely select the camera position in the horizontal direction but the camera position in the vertical direction is limited.

For example, as shown in FIG. 12b, the camera Ca1 to the camera Ca5 are disposed in the vertical direction in the camera plane. Here, the camera Ca1 to the camera Ca5 may be actual cameras or may be virtual cameras. In the example of FIG. 12, a virtual camera VC is arranged in a position which is substantially the same as the height of the face of a person who is the object. In this case, the light, which passes through the focal point of the virtual camera VC and is incident on each of the pixels of the film surface, is incident on all of the camera Ca1 to the camera Ca5. Accordingly, it is possible to generate an image which is imaged using the virtual camera VC based on the images which are imaged by the cameras in the camera plane.

Figure 13:
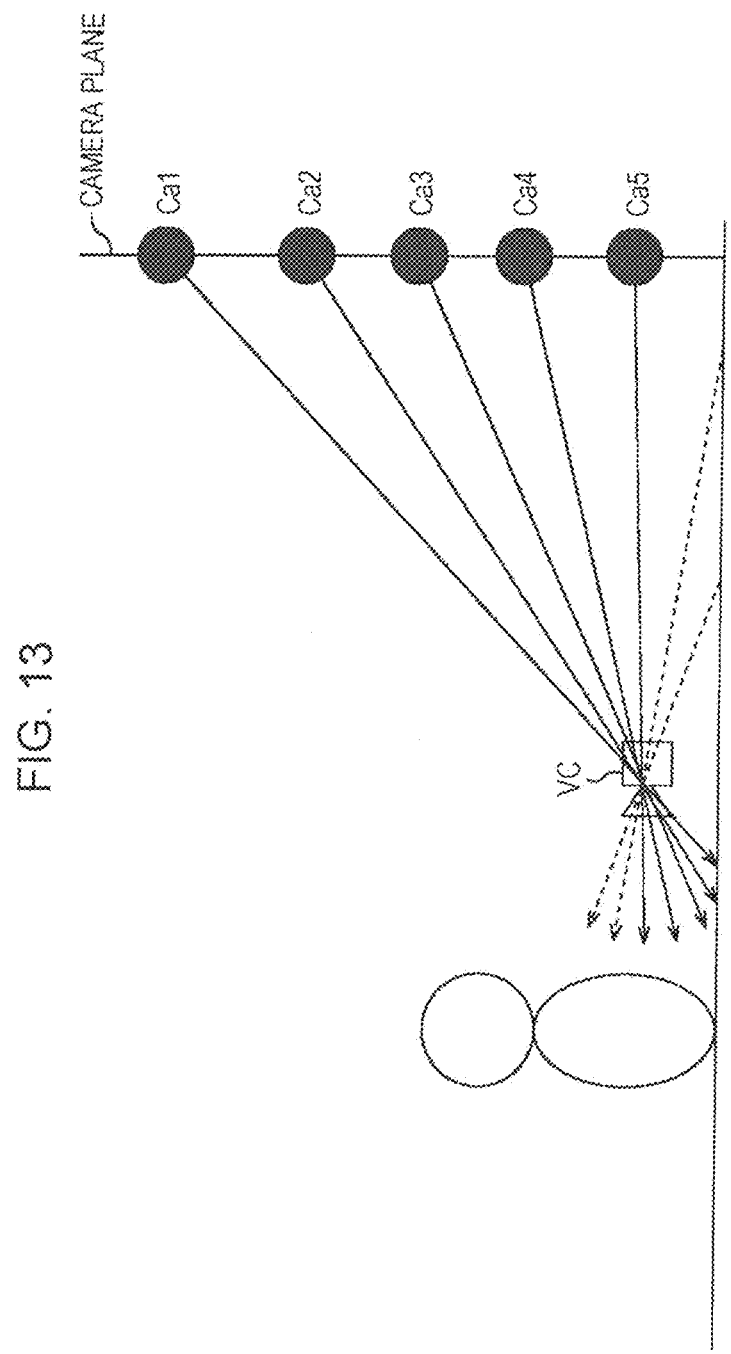
FIG. 13 is a diagram describing a limit on the arrangement position of a virtual camera.

On the other hand, for example, in a case where the virtual camera VC is arranged at the feet of a person who is the object as shown in FIG. 13, a portion of the light, which passes through the focal point of the virtual camera VC and is incident on each of the pixels of the film surface, is not incident on the camera Ca1 to the camera Ca5. In the case of FIG. 13, the light which is incident from the upward direction of the virtual camera VC is not incident on the cameras of the camera plane, for example, it is not possible to generate pixels to the extent of substantially the upper half of the screen surface in the image which is imaged by the virtual camera VC.

In this manner, the camera position in the vertical direction is limited in the case where the virtual cameras are disposed.

Here, an example has been described where the actual cameras are disposed in the surroundings of the soccer stadium, but for example, other applied examples such as the actual cameras being arranged in the surroundings of a concert hall are able to be considered.

Figure 14:
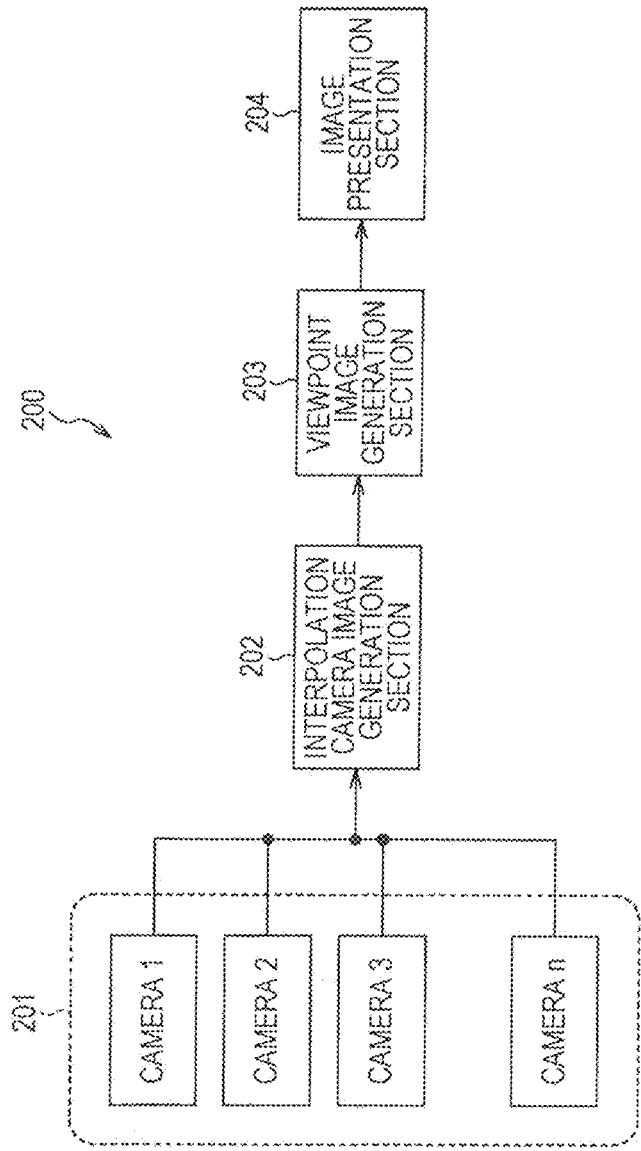
FIG. 14 is a block diagram illustrating a configuration example of an image processing device according to an embodiment of the present invention.

FIG. 14 is a block diagram illustrating a configuration example of an image processing device according to an embodiment of the present invention. An image processing device 200 which is shown in the same diagram is configured using an imaging section 201, a supplement camera image generation section 202, a viewpoint image generation section 203, and an image presentation section 204.

In the same diagram, the imaging section 201 is configured to have a plurality of cameras, namely camera 1 to camera n. Here, the camera 1 to the camera n are actual cameras, and for example, are disposed in the vicinity of the soccer stadium as in the case of FIG. 10. In addition, the camera 1 to the camera n are arranged with a predetermined distance in the vertical direction and the horizontal direction so that it is possible to adopt a three direction supplementing method which is described above with reference to FIGS. 7 and 8. The predetermined distance is determined in consideration of image quality and cost. If the predetermined distance is too large, the image quality may not be satisfying. If the predetermined distance is too small, the cost of arranging so many cameras may be too high. The predetermined distance may be in the range from approximately 5 meters to 50 meters.

The imaging section 201 supplies data of images which are imaged by the camera 1 to the camera n to the supplement camera image generation section 202. Here, each of the pieces of data of the images which are imaged by the camera 1 to the camera n are supplied so as to correspond to information which specifies the position of each of the cameras in the camera plane (for example, coordinates position of the camera).

The supplement camera image generation section 202 generates the supplement camera image based on the data of the image which is imaged using the camera 1 to the camera n. At this time, the image of the supplement camera is generated using the three point completion method which is described above with reference to FIGS. 7 and 8. Due to this, the image which is imaged using each position in the camera plane is recorded.

For example, the viewpoint image generation section 203 receives input of a viewpoint which is desired by the user and generates images with regard to the viewpoint. For example, the viewpoint image generation section 203 generates an image with a viewpoint which is desired by the user by receiving input such as the viewpoint P1 and the viewpoint P2 shown in FIG. 10 and generating the image which is imaged by the virtual camera with regard to the viewpoint.

The image presentation section 204 presents the image which is generated using the viewpoint image generation section 203 in a display or the like which is not shown. Due to this, it is possible for the user to view to the desired viewpoint image.

Here, the image presentation section 204 may be provided as a separate device to the image processing device 200.

Figure 15:
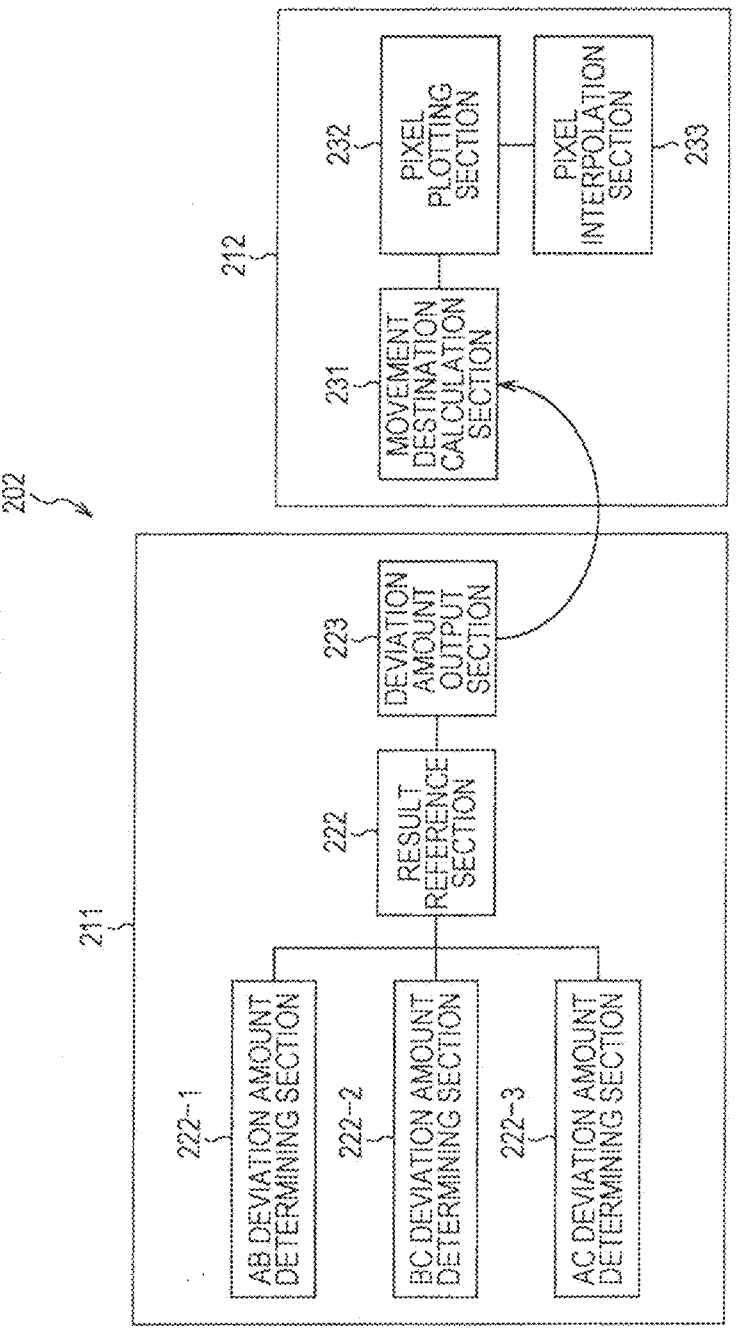
FIG. 15 is a block diagram illustrating a detailed configuration example of the supplement camera image generation section of FIG. 14.

FIG. 15 is a block diagram illustrating a detailed configuration example of the supplement camera image generation section 202. The supplement camera image generation section 202 is configured by a deviation amount calculation section 211 and a pixel generation section 212 as shown in the same diagram.

The deviation amount calculation section 211 is configured by an AB deviation amount determining section 221-1, a BC deviation amount determining section 221-2, an AC deviation amount determining section 221-3, a result reference section 222, and a deviation amount output section 223.

For example, the deviation amount calculation section 211 calculates the amount of deviation as described with reference to FIG. 9. The deviation amount calculation section 211 specifies the position of the supplement camera which images the image which is to be supplemented here, specifies the triangle plane which is set according to the position thereof, and specifies the actual cameras which configure the corners of the triangle. At this time, for example, the camera A to the camera C in FIG. 9 are specified.

Each of the AB deviation amount determining section 221-1, the BC deviation amount determining section 221-2, and the AC deviation amount determining section 221-3 determines (calculates) the amount of deviation of the image which is imaged using the actual cameras which configure the corners of the triangle described above. The AB deviation amount determining section 221-1, the BC deviation amount determining section 221-2, and the AC deviation amount determining section 221-3 acquire the images of the actual cameras which are supplied from the imaging section 201 and specify the pixels which correspond to each of the images by performing a block matching process or the like. For example, the block which is formed from the pixels of the soccer ball in the image 101 and the image 102 of FIG. 9 is specified as the block which corresponds to each of the images.

Then, the AB deviation amount determining section 221-1, the BC deviation amount determining section 221-2, and the AC deviation amount determining section 221-3 calculate the vectors which represent the distance and direction between each camera (the AB vector, the BC vector, and the AC vector) and the vectors which represent the parallax between each of the cameras (the AB parallax vector, the BC parallax vector, and the AC parallax vector) as described with reference to FIG. 9.

After this, the AB deviation amount determining section 221-1 calculates the amount of deviation using (AB parallax vector)/(AB vector). In addition, the BC deviation amount determining section 221-2 calculates the amount of deviation using (BC parallax vector)/(BC vector) and the AC deviation amount determining section 221-3 calculates the amount of deviation using (AC parallax vector)/(AC vector).

For example, the result reference section 222 calculates the central value of the results of each of the calculations by the AB deviation amount determining section 221-1, the BC deviation amount determining section 221-2, and the AC deviation amount determining section 221-3. Alternatively, in addition, the central value may be calculated by the two values which are the closest being selected out of the calculation result of the three types of the AB deviation amount determining section 221-1, the BC deviation amount determining section 221-2, and the AC deviation amount determining section 221-3.

The deviation amount output section 223 supplies the value which is output from the result reference section 222 to the pixel generation section 212 as the amount of deviation.

The pixel generation section 212 generates the pixels of the image of the supplement camera at a predetermined position based on the amount of deviation which is calculated using the deviation amount output section 223. The pixel generation section 212 is configured by a movement destination calculation section 231, a pixel plotting section 232, and a pixel supplement section 233.

The movement destination calculation section 231 specifies the position of the supplement camera which images the image which is to be supplemented here and a vector which represent the distance and the direction with the position of the actual camera which configures any of the corners of the triangle in the three point supplementing method which is described above. At this time, for example, in a case where the supplement camera is the camera K in FIG. 9, the AK vector which connects the center points of the lenses of each of the camera A and the camera K are specified. Then, the movement destination calculation section 231 specifies a vector, which is obtained by, for example, multiplying the AK vector with the amount of deviation which is output from the deviation amount output section 223, as the movement destination vector.

The pixel plotting section 232 extracts the block which is configured by a predetermined number of pixels in the image which is imaged by the actual camera and attaches pixels which configure the block to a predetermined position in the image of the supplement camera. At this time, the pixel plotting section 232 specifies the position in the image of the supplement camera where the pixels are attached based on the movement destination vector which is specified using the movement destination calculation section 231.

For example, in a case where the supplement camera is the camera K of FIG. 9, the pixel with the coordinates (x1, y1) which is one point on the soccer ball of the image 101 is attached to the coordinates (x2, y2) which are shown using the movement destination vector with the coordinates (x1, y1) as the origin. At this time, the movement and attachment may be performed in pixel units or the movement and attachment may be performed in block units.

The pixel supplement section 233 supplements a pixel in a position where it is not possible to attach a pixel using the pixel plotting section 232. For example, the pixel supplement section 233 supplements a pixel of the background in a case where a portion of the background which is hidden by the foreground in the image of the actual camera is not hidden by the foreground in the image of the supplement camera. In this case, for example, there is supplementing using a nearby pixel which configures the background.

Figure 16:
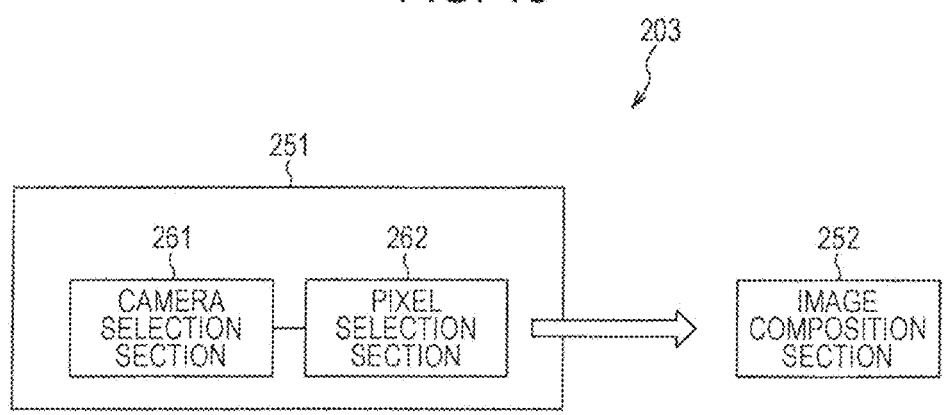
FIG. 16 is a block diagram illustrating a detailed configuration example of the viewpoint image generation section of FIG. 13.

FIG. 16 is a block diagram illustrating a detailed configuration example of the viewpoint camera image generation section 203 of FIG. 14. The viewpoint image generation section 203 which is shown in the same diagram is configured by a pixel acquisition section 251 and a pixel composition section 252.

For example, the pixel acquisition section 251 specifies the position of the viewpoint which has been input by the user and selects pixels of the image which is imaged at the position from among the pixels of the images of the camera plane. The pixel acquisition section 251 is configured to have a camera selection section 261 and a pixel selection section 262.

For example, the pixel acquisition section 251 specifies the position of the viewpoint which has been input by the user so as to be the viewpoint P1, the viewpoint P2 or the like of FIG. 10. Then, the pixel acquisition section 251 acquires by selecting the camera and the pixels of the camera plane for obtaining the image seen from the viewpoint P1 or the viewpoint P2 by imaging the image where the virtual camera is arranged at the viewpoint P1 or the viewpoint P2 as described above.

The camera selection section 261 extends the straight line Lv which connects the pixels and the focal point of the virtual camera to the camera plane and selects the camera which is the closest to the intersection of the straight line Lv and the camera plane out of the actual cameras and the supplement cameras.

The pixel selection section 262 draws the half straight line Lw which is parallel to the straight line Lv with the focal point of the actual camera or the supplement camera which has been selected using the camera selection section 261 as the origin. Then, the pixel, which is the closest to the intersection of the half straight line Lw and the film surface of the actual camera or the supplement camera which has been selected, is extracted (selected) as the pixel with regard to the virtual camera. The pixel is specified as one pixel out of the plurality of pixels which configure the image of the actual camera or the image of the supplement camera.

The pixel which is selected using the pixel selection section 262 is supplied to the pixel composition section 252. Here, at this time, information, which specifies that the pixel which has been selected is a pixel from which position in the image which has been imaged using the virtual camera, is also supplied.

The image composition section 252 generates individual pixels from among the image which is imaged using the virtual camera by attaching the pixel which has been supplied from the pixel selection section 262 to each of the positions.

In this manner, each of the pixels which configure the image which is imaged using the virtual camera is selected from the pixels of the images which are imaged by the cameras in the camera plane. Due to this, the image seen from the viewpoint P1 or the viewpoint P2 is generated.

Figure 17:
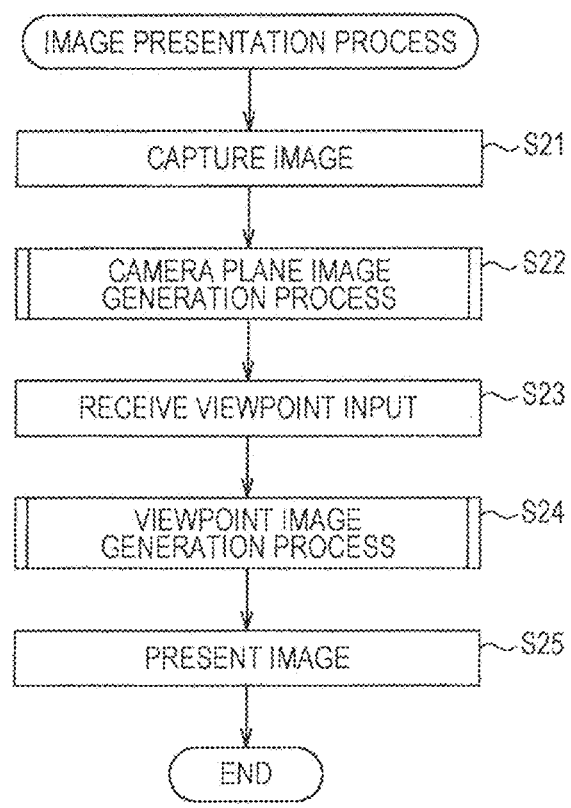
FIG. 17 is a flowchart describing an example of an image presentation process.

Next, an example of an image presentation process using the image processing device 200 of FIG. 14 will be described with reference to the flowchart of FIG. 17. For example, the process is executed when there is an instruction in terms of the presentation of a desired viewpoint by a user.

In step S21, the imaging section 201 images the respective images of the camera 1 to the camera n. Due to this, the images using the actual camera are imaged.

In addition, the imaging section 201 supplies the data of the image which is imaged by the camera 1 to the camera n to the supplement camera image generation section 202. Here, each of the pieces of data of the images which are imaged by the camera 1 to the camera n is supplied so as to correspond to the information which specifies the position of each camera on the camera plane (for example, coordinates position of the camera).

Figure 18:
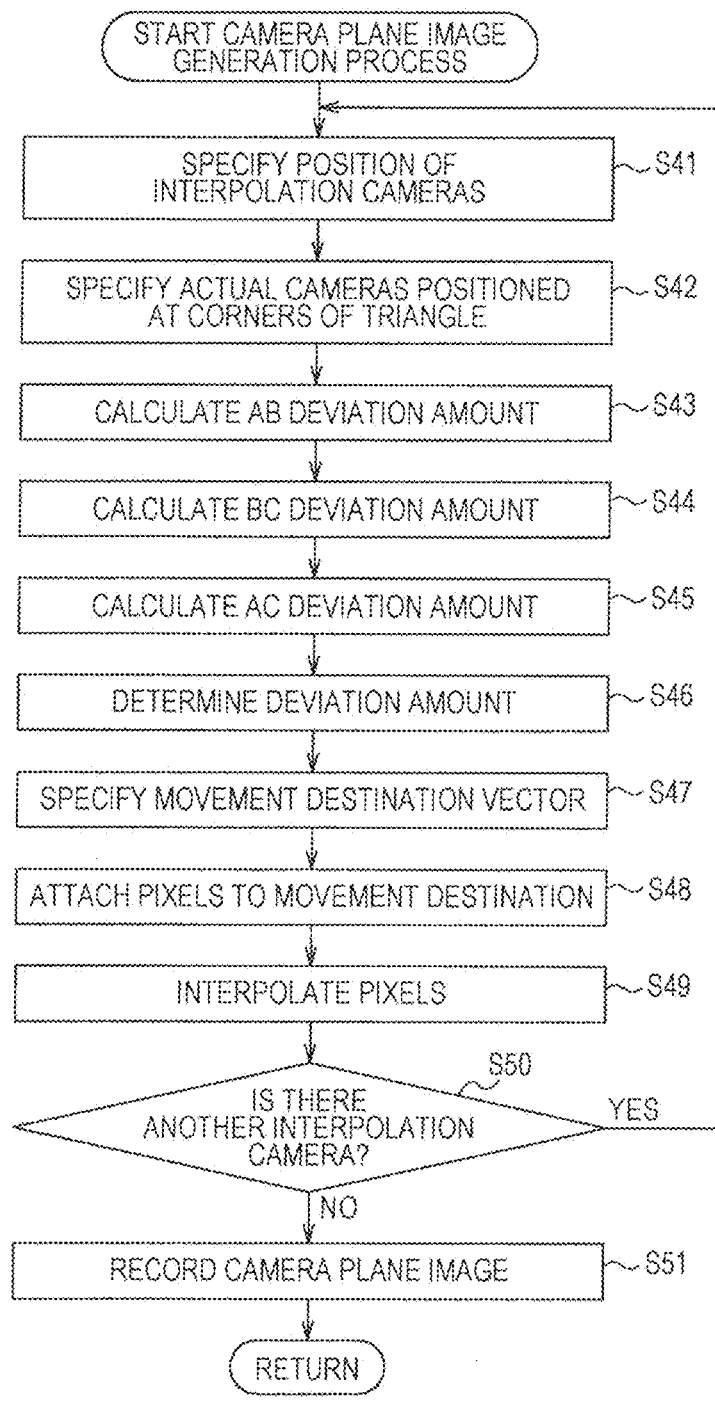
FIG. 18 is a flowchart describing an example of a camera plane image generation process.

In step S22, the supplement camera image generation section 202 executes a camera plane image generation process which will be described later with reference to FIG. 18. At this time, the image of the supplement camera is generated using, for example, the three point supplementing method which is described above with reference to FIGS. 7 and 8 based on the data of the images which are imaged by the camera 1 to the camera n. Due to this, the image which is imaged in each position in the camera plane is recorded.

In step S23, for example, the viewpoint image generation section 203 receives the input of desired viewpoint of the user. At this time, for example, the input of the viewpoint P1 or the viewpoint P2 shown in FIG. 10 or the like is received.

Figure 19:
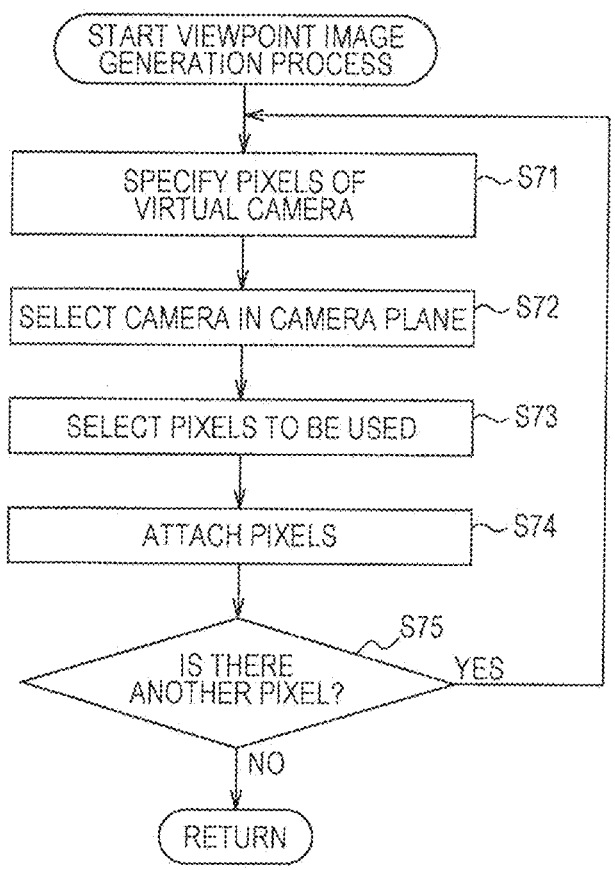
FIG. 19 is a flowchart describing an example of a viewpoint image generation process.

In step S24, the viewpoint image generation section 203 executes a viewpoint image generation process which will be described with reference to FIG. 19. Due to this, an image with a viewpoint which is received in step S23 is generated. For example, the image with the viewpoint which is desired by the user is generated by the input of the viewpoint P1 or the viewpoint P2 which are shown in FIG. 10 or the like being receiving and the image which is imaged by the virtual camera being generated in the viewpoint.

In step S25, the image presentation section 204 presents the image which is generated by the process of step S24 on a display or the like which is not shown. Due to this, it is possible for the user to view the desired viewpoint image.

In this manner, the image presentation process is executed.

Next, a detail example of the camera plane image generation process of step S22 of FIG. 17 will be described with reference to the flowchart of FIG. 18.

In step S41, the deviation amount calculation section 211 specifies the position of the supplement camera which images the image which is to be supplemented here.

In step S42, the deviation amount calculation section 211 specifies the triangle plane which is set according to the position which is specified in step S41 and specifies the actual camera which configures the corners of the triangle. At this time, for example, the camera A to the camera C of FIG. 9 is specified.

In step S43, the AB deviation amount determining section 221-1 calculates the amount of deviation (the AB deviation amount) using (AB parallax vector)/(AB vector) as described above.

In step S44, the BC deviation amount determining section 221-2 calculates the amount of deviation (the BC deviation amount) using (BC parallax vector)/(BC vector) as described above.

In step S45, the AC deviation amount determining section 221-3 calculates the amount of deviation (the AC deviation amount) using (AC parallax vector)/(AC vector) as described above.

In step S46, the result reference section 222 determines the amount of deviation. For example, the amount of deviation is determined by calculating each of the central values of the amounts of deviation which are obtained in the processes of step S43 to step S45. Alternatively, in addition, the two values which are closest out of the three types of the amounts of deviation may be selected and the central value thereof may be calculated.

The amount of deviation is output to the pixel generation section 212 by the deviation amount output section 223.

In step S47, the movement destination calculation section 231 specifies the movement destination vector. At this time, for example, in a case where the supplement camera is the camera K of FIG. 9, the AK vector which connects the center points of the lenses of each of the camera A and the camera K is specified. Then, the movement destination calculation section 231 specifies the vector, which is obtained by, for example, multiplying the AK vector with the amount of deviation which is output from the deviation amount output section 223, as the movement destination vector.

In step S48, the pixel plotting section 232 attaches the pixels based on the movement destination vector which is specified in step S47. At this time, for example, the block which is configured by a predetermined number of pixels in the image which is imaged by the actual camera is extracted and the pixels which configure the block are attached to a predetermined position in the image of the supplement camera.

For example, in a case where the supplement camera is the camera K of FIG. 9, the pixel with the coordinates (x1, y1) which is one point on the soccer ball of the image 101 is attached to the coordinates (x2, y2) which are shown using the movement destination vector with the coordinates (x1, y1) as the origin. Here, the movement and attachment may be performed in pixel units or the movement and attachment may be performed in block units.

In step S49, the pixel supplement section 233 supplements a pixel in a position where it is not possible to attach a pixel using the pixel plotting section 232. For example, the pixel supplement section 233 supplements a pixel of the background in a case where a portion of the background which is hidden by the foreground in the image of the actual camera is not hidden by the foreground in the image of the supplement camera. In this case, for example, there is supplementing using a nearby pixel which configures the background.

In step S50, whether or not there is another supplement camera is determined. For example, it is determined that there is another supplement camera in a case where there remain portions where the supplement camera is to be arranged in the camera plane.

In a case where it is determined in step S50 that there is another supplement camera, the process returns to step S41 and the process therefrom are repeatedly executed.

In a case where it is determined in step S50 that there is not another supplement camera, the process proceeds to step S51.

In step S51, the supplement camera image generation section 202 records the images of the camera plane. Due to this, the images which are imaged using the actual cameras and the images which are imaged using the supplement camera are recorded so as to correspond to the positions of each of the cameras.

In this manner, the camera plane image generation process is executed.

Next, a detail example of the viewpoint image generation process of step S24 of FIG. 17 will be described with reference to the flowchart of FIG. 19.

In step S71, the image acquisition section 251 specifies the image of the virtual camera. As described above, the pixel acquisition section 251 acquires the image seen from the viewpoint P1 or the viewpoint P2 by imaging the image where the virtual camera is arranged at the viewpoint P1 or the viewpoint P2. In step S71, the pixel which is the processing target is specified out of the pixels which configure the image which is imaged by the virtual camera.

In step S72, the camera selection section 261 selects the camera of the camera plane. At this time, for example, the straight line Lv which connects the pixels and the focal point of the virtual camera which was specified in step S71 is extended to the camera plane and the camera which is the closest to the intersection of the straight line Lv and the camera plane is selected out of the actual cameras and the supplement cameras.

In step S73, the pixel selection section 262 selects the pixels which are used. At this time, for example, the half straight line Lw which is parallel to the straight line Lv is drawn with the focal point of the actual camera or the supplement camera which has been selected in the process of step S72 as the origin. Then, the pixel, which is the closest to the intersection of the half straight line Lw and the film surface of the actual camera or the supplement camera which has been selected, is selected as the pixel which is used as the pixel of the virtual camera which is specified in step S71.

Here, the pixel which is selected using the pixel selection section 262 is supplied to the pixel composition section 252.

In step S74, the image composition section 252 attaches the pixels which are selected in the process of step S73 to the position of the pixel which is specified in the process of step S71.

In step S75, whether or not there is another pixel is determined. In addition, in a case where all of the pixels of the virtual camera have not been attached, it is determined in step S75 that there is another pixel.

In a case where it is determined that there is another pixel in step S75, the process returns to step S71 and the processes therefrom are repeatedly performed.

In a case where it is determined that there is not another pixel in step S75, the process ends.

In this manner the viewpoint image generation process is executed.

In the related art, a technique is proposed where a three-dimensional formation of the object is estimated using images which are imaged using a plurality of cameras and the images seen from an arbitrary viewpoint is reconfigured as computer graphics with texture attached thereto. However, in the method which estimates the three-dimensional object model using stereo matching, there is a possibility that there are defects in portion which are difficult to model such as the head hair of a person. When there are defects in the modeling in this manner, there is an image that there is large rupture as the image. In addition, the processing load is large due to the addition of texture and the like and simplification of the processing is expected.

Furthermore, it is proposed in the related art that the cameras are arranged so as to encompass the stadium and there is a presentation where the viewpoint is freely switched in a scene which is intended for replay, but there is a problem in that costs are involved in order to provide an image which is actually of interest.

With regard to this, according to embodiments of the present disclosure, since the generation of the camera plane image is performed and the generation of the viewpoint image is performed as described above, it is possible to perform generation of a multi-viewpoint image by only arranging the plurality of cameras in limited positions. In addition, since it is not necessary to use computer graphics or the like, it is possible to provide viewpoint images which are real and powerful and it is possible to reduce the processing load.

Accordingly, according to the present invention, it is possible to provide an image seen from a plurality of viewpoints in a wider range of space at a low cost.

Here, it is described above that the block which is configured using a predetermined number of pixels of the image which is imaged using the actual cameras is extracted and the movement and the attachment are performed using the pixel plotting section 232 of FIG. 15. At this time, the block which is extracted may be a block which is configured by 9×9 pixels which are centered on a predetermined pixel or may be a block which is configured by pixels of the same class by clustering of pixel colors.

For example, all of the pixels of one image are divided into classes based on colors of the pixels using a K-means method. Pixel groups which belong to each of the classes which are obtained as a result may be extracted as blocks using the pixel plotting section 232 and the movement and the attachment may be performed as described above.

By doing this, it is possible to more effectively and appropriately perform the movement and the attachment of the pixels and it is possible to more quickly generate the image of the supplement camera with a higher level of completion.

In addition, an example is described above where an embodiment of the present disclosure is applied to, for example, the image processing device 200 which is shown in FIG. 14. That is, it is described that the present invention is applied to the image processing device 200 which has the supplement camera image generation section 202 which generates an image of the supplement camera based on the image which is imaged by the imaging section 201 and the viewpoint image generation section 203 which generates a desired viewpoint image which is imaged using a virtual camera.

Figure 20:
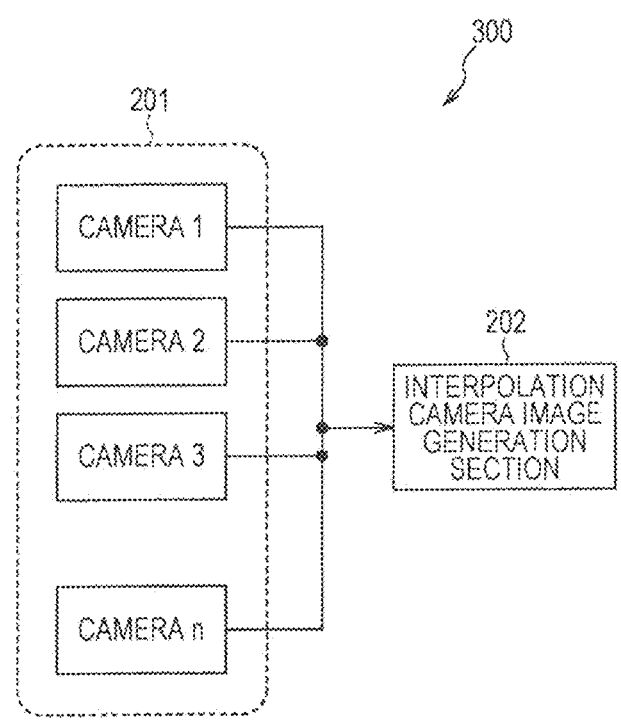
FIG. 20 is a block diagram illustrating a configuration example of a supplement image generation section according to an embodiment of the present invention.

However, for example, as shown in FIG. 20, it is possible for the present disclosure to be embodied as a supplement image generation device 300 which is configured by the supplement camera image generation section 202 which generates an image of the supplement camera based on the image which is imaged by the imaging section 201. That is, the generation of the image of the camera plane which is described above is a technique which is effective in the generation of multi-viewpoint images, the generation of 3D images, and the like.

In addition, as described above, in the present invention, due to the adoption of the three point supplementing method, for example, performing of calculations for supplementing in the vertical direction after the completion of the supplementing in the horizontal direction is not necessary and it is possible to suppress the amount of calculation, the process load, and the processing time. In addition, different from the case of the four point supplementing method, in the three point supplementing method, there is ample robustness and the transfer of calculation error may be prevented. In this manner, the present disclosure is able to perform the generation of the images of the camera plane using a method which is not described in the related art.

Here, the series of processes which are described above are able to be executed using hardware or are able to be executed using software. In a case where the series of processes which are described above are executed using software, a process which configures the software is installed from a network or a recording medium to a computer where specialized hardware is built in, a general personal computer 700 which is, for example, shown in FIG. 21 which is able to execute the various processes by various programs being installed, or the like.

Figure 21:
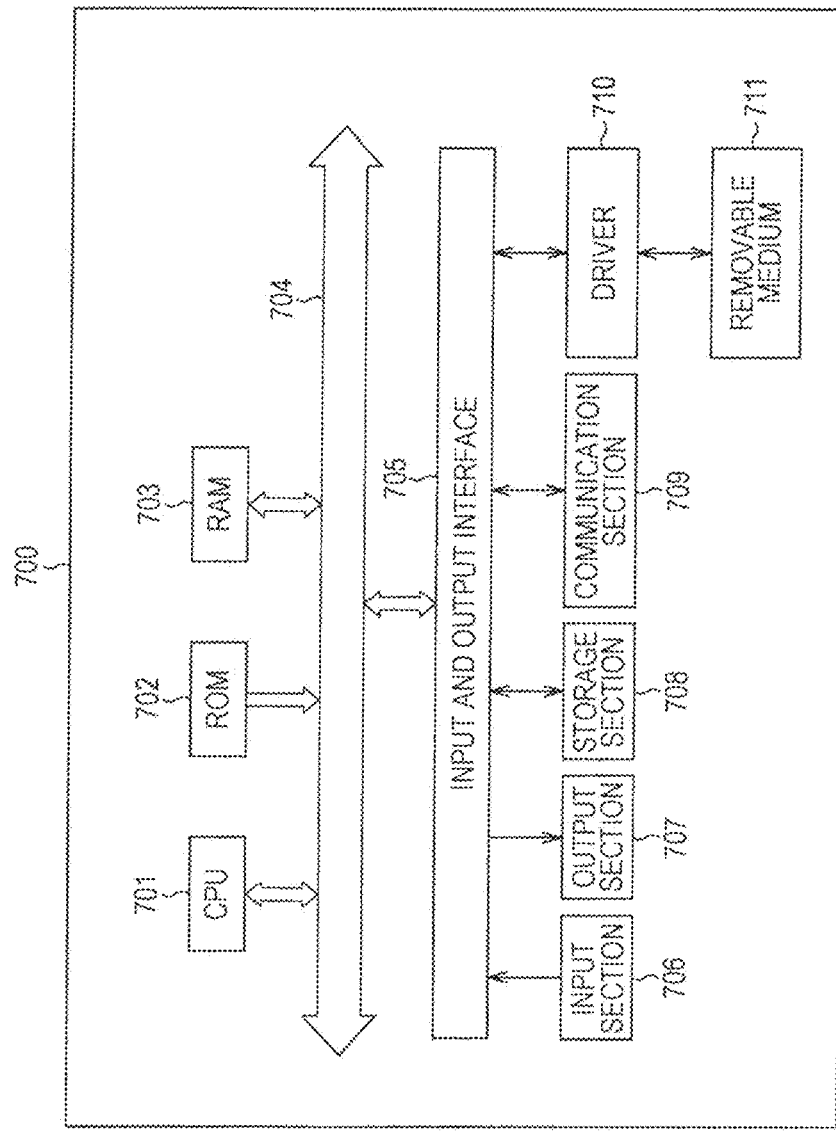
FIG. 21 is a block diagram illustrating a configuration example of a personal computer.

In FIG. 21, a CPU (Central Processing Unit) 701 executes various processes in accordance with a program which is stored in a ROM (Read Only Memory) 702 or a program which is loaded to a RAM (Random Access Memory) 703 from a storage section 708. In the RAM 703, in addition, necessary data and the like is appropriately stored for the CPU 701 to execute the various processes.

The CPU 701, the ROM 702, and the RAM 703 are connected to each other via a bus 704. An input/output interface 705 is also connected to the bus 704.

An input section 706 which is formed from a keyboard, a mouse, or the like, an output device 707 which is formed from a display formed by a LCD (Liquid Crystal Display) or the like, a speaker, or the like, a storage section 708 which is configured from a hard disk or the like, and a communication section 709 which is configured from a network interface card such as a modem or a LAN card or the like are connected in the input/output interface 705. The communication section 709 performs a communication process via the network which includes the Internet.

In addition, a drive 710 is connected to the input and output interface 705 as necessary, a removable medium 711 such as a magnetic disc, an optical disc, a magneto optical disc, a semiconductor memory, or the like is appropriately mounted, and a computer program which is read out therefrom is installed into the storage section 708 as necessary.

In a case where the series of processes described above are executed using software, the program which configures the software is installed from a network such as the Internet or a recording medium which is formed from the removable medium 711 or the like.

Here, the recording medium is configured from not only the removable medium 711 which is formed from a magnetic disc (which includes a floppy disk (registered trademark)), an optical disc (which includes a CD-ROM (Compact Disc-Read Only Memory) or a DVD (Digital Versatile Disk), a magneto optical disc (which includes a MD (Mini-Disk) (registered trademark), a semiconductor memory, or the like where the program is recorded which is distributed separately to the device body for delivery of the program to the user as shown in FIG. 21, but also includes a configuration of a hard disk or the like which includes the ROM 702 or the storage section 708 which recorded the program which are distributed to the user in a state of being embedded in the device body in advance.

Here, the series of processes in the specifications may be processes which are performed in a time series manner in line with the order described above but may not necessarily be processes in a time series manner and include processes where the processing is performed in parallel or executed individually.

In addition, the embodiments of the present invention are not limited to the embodiment described above but various modifications are possible within the scope which does not depart from the concept of the present disclosure.

Throughout the specification and claims, the following terms take at least the meanings explicitly associated herein, unless the context dictates otherwise. The meanings identified below do not necessarily limit the terms, but merely provide illustrative examples for the terms. In the text, the terms "comprising", "comprise", "comprises" and other forms of "comprise" can have the meaning ascribed to these terms in U.S. Patent Law and can mean "including", "include", "includes" and other forms of "include." The term "contains" or other forms thereof, as used herein, is synonymous with "comprises" or "includes"; it is similarly inclusive or open-ended and does not exclude additional, unrecited elements or steps. The term "composed" or other forms thereof, as used herein, denotes that some embodiments or implementations may exclude unspecified materials, compounds, elements, components, or the like (e.g., other than, for example, impurities, trace compounds, or the like), and that some embodiments may not exclude other unspecified materials, compounds, elements, components, or the like; for example, other unspecified materials, compounds, elements, may be included provided they do not adversely affect the desired characteristics of the specified material, compound, element, component, or the like, or otherwise do not materially alter the basic and novel characteristics of the embodiment or implementation. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

It will be appreciated by those skilled in the art that the foregoing brief description and the following detailed description are exemplary (i.e., illustrative) and explanatory of the subject matter of the present disclosure, but are not intended to be restrictive thereof or limiting of the advantages which can be achieved by the present disclosure in various implementations. Additionally, it is understood that the foregoing summary and ensuing detailed description are representative of some embodiments of the present disclosure, and are neither representative nor inclusive of all subject matter and embodiments within the scope of the present disclosure. Thus, the accompanying drawings, referred to herein and constituting a part hereof, illustrate embodiments of this disclosure, and, together with the detailed description, serve to explain principles of embodiments of the present disclosure.

Various features of novelty which characterize various aspects of the disclosure are pointed out in particularity in the claims annexed to and forming a part of this disclosure. For a better understanding of the disclosure, operating advantages and specific objects that may be attained by some of its uses, reference is made to the accompanying descriptive matter in which exemplary embodiments of the disclosure are illustrated in the accompanying drawings in which corresponding components are identified by the same reference numerals.

Here, the present disclosure is able to be taken as the following configuration.

(1) An image processing device which is provided with an imaging section which images an image of an object using a plurality of cameras, an image supplement section which supplements the image which is imaged in an arbitrary position in a plane which is configured using a plurality of line segments which connect all of or a portion of the positions of the plurality of cameras based on the image which is imaged, and an arbitrary point image generation section which generates an image of an object which is imaged from an arbitrary point in an imaging range which is common to each of the plurality of cameras based on a camera plane image which is configured using the images which are imaged using the plurality of cameras and the images which are supplemented.

(2) The image processing device described in (1) where the image supplement section supplements the image which is imaged in an arbitrary position in a triangular plane with three units out of the plurality of cameras as corners.

(3) The image processing device described in (1) or (2) where the image supplement section supplements the image by specifying three units out of the plurality of cameras, setting three combinations of two units out of the three units of cameras, calculating a first deviation amount of a first combination out of the three combinations based on the parallax of the images which are imaged by each of the cameras, calculating a second deviation amount of a second combination out of the three combinations based on the parallax of the images which are imaged by each of the cameras, calculating a third deviation amount of a third combination out of the three combinations based on the parallax of the images which are imaged by each of the cameras, determining the most proper deviation amount based on the first to the third deviation amount, specifying a movement destination vector based on the deviation amount, a position where the image which was supplemented was imaged, and a position of any one unit out of the three units of cameras, and supplementing the image by moving to attach pixels of the image which was imaged by any one unit out of the three units of cameras based on the movement destination vector.

(4) The image processing device described in any of (1) to (3) where the image supplement section supplements the image by dividing the regions of the image which is imaged using the plurality of cameras into classes based on colors of the pixels which configure the image, setting a region of pixels which belong to the same class as a unit region, and moving to attach pixels for each unit region.

(5) The image processing device described in any of (1) to (4) where the arbitrary point image generation section generates an image of the object which is imaged from an arbitrary point by arranging a virtual camera which is a virtual camera at an arbitrary point in the imaging range which is common to each of the plurality of cameras, selecting an appropriate image from among the camera plane images based on a straight line which passes through a focal point of the virtual camera and a film surface, selecting appropriate pixels from among the image which has been selected based on the straight line which passes through the focal point of the camera which imaged the selected image and the film surface and the straight line which passes through the focal point of the virtual camera and the film surface, and configuring an image which is imaged by the virtual camera using the pixels which have been selected.

(6) The image processing device described in any of (1) to (5) where the imaging section specifies an intersection of light axes of light which are irradiated onto the lenses of two units of the cameras out of the plurality of the camera and moves directions of other cameras so as to focus the intersection.

(7) An image processing device which includes the steps of imaging of an image of an object by an imaging section using a plurality of cameras, supplementing the image which is imaged in an arbitrary position in a plane which is configured using a plurality of line segments which connect all of or a portion of the positions of the plurality of cameras based on the image which is imaged by an image supplement section, and generating an image of an object, which is imaged from an arbitrary point in an imaging range which is common to each of the plurality of cameras based on a camera plane image which is configured using the images which are imaged using the plurality of cameras and the images which are supplemented, by an arbitrary point image generation section.

(8) A program which makes a computer function as an image processing device which is provided with an imaging section which images an image of an object using a plurality of cameras, an image supplement section which supplements the image which is imaged in an arbitrary position in a plane which is configured using a plurality of line segments which connect all of or a portion of the positions of the plurality of cameras based on the image which is imaged, and an arbitrary point image generation section which generates an image of an object which is imaged from an arbitrary point in an imaging range which is common to each of the plurality of cameras based on a camera plane image which is configured using the images which are imaged using the plurality of cameras and the images which are supplemented.

(9) A recording medium which stores the program described in (8).

(10) A supplement image generation device which is provided with an imaging section which images an image of an object using a plurality of cameras and an image supplement section which supplements the image which is imaged in an arbitrary position in a plane which is configured using a plurality of line segments which connect all of or a portion of the positions of the plurality of cameras based on the image which is imaged, where the image supplement section supplements the image by specifying three units out of the plurality of cameras, setting three combinations of two units out of the three units of cameras, calculating a first deviation amount of a first combination out of the three combinations based on the parallax of the images which are imaged by each of the cameras, calculating a second deviation amount of a second combination out of the three combinations based on the parallax of the images which are imaged by each of the cameras, calculating a third deviation amount of a third combination out of the three combinations based on the parallax of the images which are imaged by each of the cameras, determining the most proper deviation amount based on the first to the third deviation amount, specifying a movement destination vector based on the deviation amount, a position where the image which was supplemented was imaged, and a position of any one unit out of the three units of cameras, and supplementing the image by attaching and moving pixels of the image which was imaged by any one unit out of the three units of cameras based on the movement destination vector.

(11) The supplement image generation device described in (10) where the image supplement section supplements the image by dividing the regions of the image which is imaged using the plurality of cameras into classes based on colors of the pixels which configure the image, setting a region of pixels which belong to the same class as a unit region, and supplementing the image by moving to attach pixels for each unit region.

(12) A supplement image generation method including imaging an image of an object by an imaging section using a plurality of cameras, and supplementing the image which is imaged in an arbitrary position in a plane which is configured using a plurality of line segments which connect all of or a portion of the positions of the plurality of cameras based on the image which is imaged by an image supplement section, where the image supplement section supplements the image by specifying three units out of the plurality of cameras, setting three combinations of two units out of the three units of cameras, calculating a first deviation amount of a first combination out of the three combinations based on the parallax of the images which are imaged by each of the cameras, calculating a second deviation amount of a second combination out of the three combinations based on the parallax of the images which are imaged by each of the cameras, calculating a third deviation amount of a third combination out of the three combinations based on the parallax of the images which are imaged by each of the cameras, determining the most proper deviation amount based on the first to the third deviation amount, specifying a movement destination vector based on the deviation amount, a position where the image which was supplemented was imaged, and a position of any one unit out of the three units of cameras, and supplementing the image by attaching and moving pixels of the image which was imaged by any one unit out of the three units of cameras based on the movement destination vector.

(13) A program which makes a computer function as an image processing device which is provided with an imaging section which images an image of an object using a plurality of cameras, and an image supplement section which supplements the image which is imaged in an arbitrary position in a plane which is configured using a plurality of line segments which connect all of or a portion of the positions of the plurality of cameras based on the image which is imaged, where the image supplement section supplements the image by specifying three units out of the plurality of cameras, setting three combinations of two units out of the three units of cameras, calculating a first deviation amount of a first combination out of the three combinations based on the parallax of the images which are imaged by each of the cameras, calculating a second deviation amount of a second combination out of the three combinations based on the parallax of the images which are imaged by each of the cameras, calculating a third deviation amount of a third combination out of the three combinations based on the parallax of the images which are imaged by each of the cameras, determining the most proper deviation amount based on the first to the third deviation amount, specifying a movement destination vector based on the deviation amount, a position where the image which was supplemented was imaged, and a position of any one unit out of the three units of cameras, and supplementing the image by attaching and moving pixels of the image which was imaged by any one unit out of the three units of cameras based on the movement destination vector.

(14) A recording medium which stores the program described in (13).

(15) An image-processing apparatus for generating images from a plurality of viewpoints, comprising:

a supplementation section that receives images captured by a plurality of image capturing devices arranged on a predetermined plane and generates supplemental images at a plurality of supplemental camera positions on the predetermined plane, each supplemental image being generated based on images captured by a predetermined number of the image capturing devices on the predetermined plane; and a viewpoint image generation section that generates a viewpoint image from a viewpoint by selecting pixels from the plurality of supplemental images and captured images.

(16) The image-processing apparatus described in (15), wherein the predetermined plane is a curved plane surrounding an object of interest.

(17) The image-processing apparatus described in (15) or (16), wherein optical axes of the plurality of the image capturing devices intersect with each other substantially at an object of interest.

(18) The image-processing apparatus described in any of (15) to (17), wherein the viewpoint is selected from a focal area common to the plurality of image capturing devices.

(19) The image-processing apparatus described in any of (15) to (18), wherein the image supplementation section generates a plurality of deviation amounts, each representing a movement of a same object in images captured by two of the predetermined number of image capturing devices.

(20) The image-processing apparatus described in (15) or (19), wherein the supplementation section calculates a deviation amount based on a parallax vector and a position vector of the two image capturing devices, and the supplementation section further determines a central value among the plurality of deviation amounts.

(21) The image-processing apparatus described in (15), (19) or (20), wherein the image supplementation section uses the plurality of deviation amounts and a supplemental camera position to generate a moving destination vector of the supplemental camera position.

(22) The image-processing apparatus described in any of (15) to (19), wherein the image supplementation section extracts a movement of an image block of a plurality of pixels.

(23) The image-processing apparatus described in (15) or (19), wherein the image block includes a plurality of pixels centered on a predetermined pixel.

(24) The image-processing apparatus described in (15), (22) or (23), wherein the image block includes a same class of pixels grouped according to colors of pixels by using a K-means method.

(25) The image-processing apparatus described in any of (15) to (19), or (22) wherein, for a pixel of the viewpoint image, the image generation section determines a supplemental image or a captured image closest to a first intersection where a first line connecting the pixel of the viewpoint image and a focal point of a first virtual camera at the viewpoint meets the predetermined plane and then selects, from the determined image, a pixel closest to a second intersection where a second line parallel with the first line and passing through a focal point of a second virtual camera of the determined image meets the determined image as the pixel of the viewpoint image.

(26) The image-processing apparatus described in any of (15) to (19), (22) or (25), wherein each supplemental image is generated using images captured by three triangularly-arranged image capturing devices.

(27) An image-processing method of generating images from a plurality of viewpoints, comprising:

receiving images captured by a plurality of image capturing devices arranged on a predetermined plane;

generating supplemental images at a plurality of supplemental camera positions on the predetermined plane, each supplemental image being generated based on images captured by a predetermined number of the image capturing devices on the predetermined plane; and generating a viewpoint image from a viewpoint by selecting pixels from the plurality of supplemental images and captured images.

(28) An image-processing method described in (27), further comprising:

generating a plurality of deviation amounts representing a movement of a same object between two images, each representing a movement of a same object in images captured by two of the predetermined number of image capturing devices.

(29) An image-processing method described in (27) or (28), further comprising:

calculating a deviation amount based on a parallax vector and a position vector of the two image capturing devices, and determining a central value among the plurality of deviation amounts.

(30) An image-processing method described in any of (27) to (29), further comprising:

generating a moving destination vector of a supplemental camera position by using the plurality of deviation amounts and the supplemental camera position.

(31) An image-processing method described in (27) or (28), further comprising:

extracting a movement of an image block of a plurality of pixels, the image block including a plurality of pixels centered on a predetermined pixel or a same class of pixels grouped according to colors of pixels by using a K-means method.

(32) An image-processing method described in any of (27), (28) or (31), wherein, for a pixel of the viewpoint image, the supplemental image generation step determines a supplemental image or a captured image closest to a first intersection where a first line connecting the pixel of the viewpoint image and a focal point of a first virtual camera at the viewpoint meets the predetermined plane and then selects, from the determined image, a pixel closest to a second intersection where a second line parallel with the first line and passing through a focal point of a second virtual camera of the determined image meets the determined image as the pixel of the viewpoint image.

(33) An image-processing method described in any of (27), (28), (31) or (32), wherein each supplemental image is generated using images captured by three triangularly-arranged image capturing devices.

(34) A non-transitory storage medium storing a program that causes a computer to execute an image-processing method of generating images from a plurality of viewpoints, the image-processing method comprising:

receiving images captured by a plurality of image capturing devices arranged on a predetermined plane;

generating supplemental images at a plurality of supplemental camera positions on the predetermined plane, each supplemental image being generated based on images captured by a predetermined number of the image capturing devices on the predetermined plane; and generating a viewpoint image from a viewpoint by selecting pixels from the plurality of supplemental images and captured images.

REFERENCE SIGNS LIST

200: IMAGE PROCESSING DEVICE
201: IMAGING SECTION
202: SUPPLEMENT CAMERA IMAGE GENERATION SECTION
203: VIEWPOINT IMAGE GENERATION SECTION
204: IMAGE PRESENTATION SECTION
221-1: AB DEVIATION AMOUNT DETERMINING SECTION
221-2: BC DEVIATION AMOUNT DETERMINING SECTION
221: DEVIATION AMOUNT DETERMINING SECTION
212: PIXEL GENERATION SECTION
221-3: AC DEVIATION AMOUNT DETERMINING SECTION
222: RESULT REFERENCE SECTION
223: DEVIATION AMOUNT OUTPUT SECTION
231: MOVEMENT DESTINATION CALCULATION SECTION
232: PIXEL PLOTTING SECTION
233: PIXEL SUPPLEMENT SECTION
251: PIXEL ACQUISITION SECTION
252: PIXEL COMPOSITION SECTION
261: CAMERA SELECTION SECTION
262: PIXEL SELECTION SECTION
300: SUPPLEMENT IMAGE GENERATION DEVICE

The invention claimed is:

1. An image-processing apparatus for generating images from a plurality of viewpoints, comprising circuitry configured to:

receive images captured by a plurality of image capturing devices arranged on a predetermined plane and generate supplemental images at a plurality of supplemental camera positions on the predetermined plane, each supplemental image being generated based on images captured by a predetermined number of the image capturing devices on the predetermined plane, the supplemental camera positions being different from positions of the image capturing devices; and generate a viewpoint image from a viewpoint based on a selection of pixels from the pixels of at least one of the supplemental images and captured images, wherein the viewpoint is selected from a focal area common to an imaging range of each of the plurality of the image capturing devices, and cause a display of the viewpoint image on a display device;

wherein the circuitry is configured to calculate a deviation amount based on a parallax vector and a position vector, the deviation amount being used to determine a shift of an object in the viewpoint image, the parallax vector representing a movement of a same object in two images captured by two of the predetermined number of image capturing devices and the position vector representing the distance and position between the two image capturing devices.

2. The image-processing apparatus according to claim 1, wherein the predetermined plane is a curved plane surrounding an object of interest.

3. The image-processing apparatus according to claim 1, wherein optical axes of the plurality of the image capturing devices intersect with each other substantially at an object of interest.

4. The image-processing apparatus according to claim 1, wherein the circuitry is configured to generate a plurality of deviation amounts between a supplemental camera position and each one of the predetermined number of image capturing devices.

5. The image-processing apparatus according to claim 4, wherein the circuitry is configured to determine a central value among the plurality of deviation amounts.

6. The image-processing apparatus according to claim 5, wherein the circuitry is configured to use the plurality of deviation amounts and the supplemental camera position to generate a moving destination vector of the supplemental camera position.

7. The image-processing apparatus according to claim 1, wherein the circuitry is configured to extract a movement of an image block of a plurality of pixels.

8. The image-processing apparatus according to claim 7, wherein the image block includes a plurality of pixels centered on a predetermined pixel.

9. The image-processing apparatus according to claim 7, wherein the image block includes a same class of pixels grouped according to colors of pixels by using a K-means method.

10. The image-processing apparatus according to claim 1, wherein, for a pixel of the viewpoint image, the image circuitry is configured to determine a supplemental image or a captured image closest to a first intersection where a first line connecting the pixel of the viewpoint image and a focal point of a first virtual camera at the viewpoint meets the predetermined plane and then select, from the determined image, a pixel closest to a second intersection where a second line parallel with the first line and passing through a focal point of a second virtual camera of the determined image meets the determined image as the pixel of the viewpoint image.

11. The image-processing apparatus according to claim 1, wherein each supplemental image is generated using images captured by three triangularly-arranged image capturing devices.

12. An image-processing method of generating images from a plurality of viewpoints, comprising:
   receiving images captured by a plurality of image capturing devices arranged on a predetermined plane;
   generating supplemental images at a plurality of supplemental camera positions on the predetermined plane, each supplemental image being generated based on images captured by a predetermined number of the image capturing devices on the predetermined plane, the supplemental camera positions being different from positions of the image capturing devices; and
   generating a viewpoint image from a viewpoint based on a selection of pixels from the pixels of at least one of the supplemental images and captured images,
   causing a display of the viewpoint image on a display device;
   wherein the viewpoint is selected from a focal area common to an imaging range of each of the plurality of the image capturing devices, and
   wherein the supplemental image generating step calculates a deviation amount based on a parallax vector and a position vector, the deviation amount being used to determine a shift of an object in the viewpoint image, the parallax vector representing a movement of a same object in two images captured by two of the predetermined number of image capturing devices and the position vector representing the distance and position between the two image capturing devices.

13. The image-processing method according to claim 12, further comprising:
   generating a plurality of deviation amounts between a supplemental camera position and each one of the plurality of the image capturing device.

14. The image-processing method according to claim 13, further comprising:
   determining a central value among the plurality of deviation amounts.

15. The image-processing method according to claim 14, further comprising:
   generating a moving destination vector of the supplemental camera position by using the plurality of deviation amounts and the supplemental camera position.

16. The image-processing method according to claim 12, further comprising:
   extracting a movement of an image block of a plurality of pixels, the image block including a plurality of pixels centered on a predetermined pixel or a same class of pixels grouped according to colors of pixels by using a K-means method.

17. The image-processing method according to claim 12, wherein, for a pixel of the viewpoint image, the supplemental image generation step determines a supplemental image or a captured image closest to a first intersection where a first line connecting the pixel of the viewpoint image and a focal point of a first virtual camera at the viewpoint meets the predetermined plane and then selects, from the determined image, a pixel closest to a second intersection where a second line parallel with the first line and passing through a focal point of a second virtual camera of the determined image meets the determined image as the pixel of the viewpoint image.

18. The image-processing method according to claim 12, wherein each supplemental image is generated using images captured by three triangularly-arranged image capturing devices.

19. A non-transitory storage medium storing a program that causes a computer to execute an image-processing method of generating images from a plurality of viewpoints, the image-processing method comprising:
   receiving images captured by a plurality of image capturing devices arranged on a predetermined plane;
   generating supplemental images at a plurality of supplemental camera positions on the predetermined plane, each supplemental image being generated based on images captured by a predetermined number of the image capturing devices on the predetermined plane, the supplemental camera positions being different from positions of the image capturing devices; and
   generating a viewpoint image from a viewpoint based on a selection of pixels from the pixels of at least one of the supplemental images and captured images,
   causing a display of the viewpoint image on a display device;
   wherein the viewpoint is selected from a focal area common to an imaging range of each of the plurality of the image capturing devices, and
   wherein the circuitry is configured to calculate a deviation amount based on a parallax vector and a position vector, the deviation amount being used to determine a shift of an object in the viewpoint image, the parallax vector representing a movement of a same object in two images captured by two of the predetermined number of image capturing devices and the position vector representing the distance and position between the two image capturing devices.

* * * * *